United States Patent
Zhang et al.

(10) Patent No.: US 12,420,418 B1
(45) Date of Patent: Sep. 23, 2025

(54) POSTURE OPTIMIZATION AND FOLLOWING CONTROL METHOD AND SYSTEM FOR ROBOT USED IN FREEFORM SURFACE REPAIR

(71) Applicant: Shandong Tianfeng Zhiyuan Intelligent Technology Co., Ltd., Jinan (CN)

(72) Inventors: Chengrui Zhang, Jinan (CN); Yisheng Yin, Jinan (CN)

(73) Assignee: Shandong Tianfeng Zhiyuan Intelligent Technology Co., Ltd., Jinan (CN)

( * ) Notice: Subject to any disclaimer, the term of this patent is extended or adjusted under 35 U.S.C. 154(b) by 0 days.

(21) Appl. No.: 19/181,861

(22) Filed: Apr. 17, 2025

(30) Foreign Application Priority Data

May 20, 2024 (CN) .......................... 202410626292.3

(51) Int. Cl.
| | |
|---|---|
| *B25J 9/16* | (2006.01) |
| *B23K 26/03* | (2006.01) |
| *B23K 26/08* | (2014.01) |
| *B23K 26/34* | (2014.01) |
| *C23C 24/10* | (2006.01) |

(52) U.S. Cl.
CPC ............ *B25J 9/1664* (2013.01); *B23K 26/03* (2013.01); *B23K 26/0884* (2013.01); *B23K 26/34* (2013.01); *B25J 9/1684* (2013.01); *B25J 9/1694* (2013.01); *C23C 24/10* (2013.01)

(58) Field of Classification Search
CPC ...... B25J 9/1664; B25J 9/1669; B25J 9/1684; B25J 9/1679; B25J 9/1694; B23K 26/02; B23K 26/03; B23K 26/032; B23K 26/34; B23K 26/342; B23K 26/0853; B23K 26/0861; B23K 26/0876; B23K 26/0884; C23C 24/10; C23C 24/103; C23C 24/106
See application file for complete search history.

(56) References Cited

FOREIGN PATENT DOCUMENTS

CN 116695113 A * 9/2023 ........... C23C 24/103

OTHER PUBLICATIONS

Shandong University (Applicant), Replacement claims (allowed) of CN202410626292.3, Dec. 19, 2024.
CNIPA, Notification to grant patent right for invention in CN202410626292.3, Dec. 27, 2024.

* cited by examiner

*Primary Examiner* — Spencer D Patton
(74) *Attorney, Agent, or Firm* — Hemisphere Law, PLLC; Zhigang Ma

(57) ABSTRACT

Provided is a robot posture optimization and follow-up control method and system for freeform surface repair. The system includes a worn surface reverse modeling module, a worn surface initial normal vector calculation module, an initial machining trajectory and normal vector extraction module, a normal vector rotation angle polynomial regression denoising module, a machining trajectory position and posture NURBS fitting module, a position and posture trajectory curvature adaptive segmentation module, a segmented trajectory position and posture synchronization acceleration and deceleration look-ahead module, and a robotic motion and laser process coordinated control module. The method and the system realize posture optimization and follow-up control in a cladding process of the robot, and ensures the processing quality of laser repair.

6 Claims, 26 Drawing Sheets

Point cloud model of a freeform surface

Point cloud model of a freeform surface (b) Joints 1-6 accelerations of robot

POSTURE OPTIMIZATION AND FOLLOWING CONTROL METHOD AND SYSTEM FOR ROBOT USED IN FREEFORM SURFACE REPAIR

CROSS-REFERENCE TO RELATED APPLICATION

This application claims priority to Chinese patent application No. CN 202410626292.3, filed to China National Intellectual Property Administration (CNIPA) on May 20, 2024, which is herein incorporated by reference in its entirety.

TECHNICAL FIELD

The present disclosure relates to the field of precision measurement technologies, and particularly to a posture optimization and following control method and system for a robot used in freeform surface repair.

BACKGROUND

Freeform surfaces have smooth shapes and good aerodynamic characteristics, and are often widely used as special functional surfaces in core functional components, such as aero-turbine engines, automobile engines and precision molds. This kind of core functional components usually work in a harsh environment characterized by a higher temperature, a higher pressure, an overload, a higher impact, jitter and susceptibility to fatigue, therefore, the core functional components are prone to wear and failure after long-term service, thereby leading to degradation or even scrapping of performances of the core functional components. Because in a process of manufacturing the core functional components, special engineering materials and complicated processing techniques are often needed, therefore, compared with manufacturing new core functional components, it is more energy-saving, material-saving, time-efficient, economical, and environmentally friendly to use a robot to perform a laser cladding process to remanufacture defective areas on the core functional components to thereby restore functionality and performance of the core functional components.

In order to realize stable distribution of spot energy in a cladding process, it is usually necessary for a laser cladding nozzle to be dynamically perpendicular to a surface to be machined. However, due to significant changes in a surface topography of a worn freeform surface compared with a standard design model, on a macroscopic level, an actual workpiece undergoes considerable alterations in shape and size. Therefore, a surface normal vector of the standard design model can no longer accurately describe the distribution of a surface normal vector of the actual workpiece. As a result, in a repair process of the actual workpiece, there is a lack of an accurate reference model to guide a trajectory planning. On a microscopic level, micro-topography and roughness of a surface of the actual workpiece change significantly. The worn surface of the actual workpiece is covered with numerous tiny pits and protrusions. In this case, if the laser cladding nozzle is strictly maintained perpendicular to the surface to be machined, it will cause severe posture jitters of the robot during the laser cladding process. This will seriously affect smoothness and stability of a repair motion, ultimately leading to a significant decline in processing quality. Moreover, due to a complex geometric shape of the workpiece with the freeform surface, during a repair process, a curvature of a position and posture trajectory varies greatly. A traditional repair process with a constant machining velocity is highly likely to cause a mechanical shock in an area with an excessive local curvature, which can lead to jitters, chatter, and even damage of the robot. A traditional constant-velocity interpolation control method is not suitable for a freeform surface repair scenario. Therefore, a dynamic adjustment and smooth control of a posture of the laser cladding nozzle during the repair process is one of key challenges in the freeform surface repair process of the robot.

Existing methods have proposed a method and system for generating a robotic processing path for laser cladding. This method extracts position and posture information of the robot by parsing a G-code data and then generates a robot processing trajectory using linear commands. However, this method does not take into account the significant changes in a shape, a size, and surface topography of the actual workpiece compared to the standard design model in the context of freeform surface wear repair, which causes that an original design model cannot accurately guide the repair processing of the worn workpiece. Moreover, a linear type of processing trajectory used in this method has disadvantages such as a lower accuracy, a poorer continuity, and insufficient smoothness, which cannot meet the requirements for precise tracking of surfaces of complex surface models in freeform surface repair scenarios. Additionally, this method does not adequately consider the issue of mechanical shocks that can easily occur in an area with an excessive local curvature when using a constant processing velocity, thereby making it difficult to ensure smoothness and stability of a position and posture motion during the repair processing.

In summary, in the freeform surface repair scenarios, due to the significant changes in the shape, the size, and the surface topography of the actual workpiece compared to the standard design model, as well as the existing methods' inadequate consideration of the surface normal vectors of the worn workpiece, jitter problems exist. Further, there is currently no effective method for posture optimization and following control for robotic cladding to achieve the dynamic adjustment and smooth control of the posture of the laser cladding nozzle.

SUMMARY

Aiming at the above shortcomings in the related art, the present disclosure provides a posture optimization and following control method and system for a robot used in freeform surface repair in order to realize dynamic adjustment and smooth control of a posture of a laser cladding nozzle in a freeform surface repair scenario. Technical solutions of the present disclosure are as follows.

In one aspect, an embodiment of the present disclosure provides a posture optimization and following control method for a robot used in freeform surface repair, which includes the following steps:

Step 1, collecting a contour of a worn freeform surface, performing reverse modeling on the worn freeform surface to obtain a reverse-reconstructed worn surface, and obtaining a size, a shape and microscopic surface topography characteristics of the worn freeform surface;

Step 2, performing denoising and sparsification on the reverse-reconstructed worn surface, and performing statistical calculation to obtain a distribution condition of original normal vectors of the reverse-reconstructed worn surface;

Step 3, designing, based on the reverse-reconstructed worn surface, machining trajectories for repairing the worn freeform surface, and combining, according to the distribution condition of the original normal vectors, positions and initial normal vectors of discrete trajectory points of the machining trajectories, to obtain 6-dimensional machining position and normal vector trajectory data;

Step 4, establishing a trajectory plane of each of the machining trajectories, and obtaining, by introducing a normal vector rotation angle and using a polynomial fitting noise reduction method with a sliding window, optimized machining position and normal vector trajectory data, Step 5, fitting, by introducing a 6-dimensional non-uniform rational b-splines (NURBS) curve, discrete position and posture data of the robot, to generate high-precision, smooth and synchronous motion position and posture trajectories of the robot;

Step 6, adaptively segmenting, based on curvatures of the motion position and posture trajectories in a position space and a posture space, the motion position and posture trajectories into hazardous segments and safe segments, and assigning processing velocities to the hazardous segments and the safe segments;

Step 7, performing, based on a position and posture synchronous look-ahead algorithm based on S-curve acceleration and deceleration, a backward deceleration iteration and a forward acceleration iteration to calculate node velocities of the hazardous segments and node velocities of the safe segments, to realize rapid and smooth transition of the processing velocities of the safe segments and the dangerous segments in the position space and the posture space; and Step 8, performing, based on the node velocities of the hazardous segments and the node velocities of the safe segments, a laser repair process on the worn freeform surface, dynamically monitoring an actual movement velocity of the robot during the laser repair process, and adjusting laser cladding process parameters online to ensure thermodynamic stability of a laser cladding molten pool in the laser repair process and improve quality of laser cladding repair.

In an embodiment, a calculation process of the original normal vectors includes: performing denoising and sparsification on the reverse-reconstructed worn surface; performing statistical calculation to obtain a three-dimensional covariance matrix of an adjacent point set at each of discrete points on the reverse-reconstructed worn surface; and performing singular value decomposition (SVD) on the three-dimensional covariance matrix to obtain the original normal vectors of the discrete points of the reverse-reconstructed worn surface.

In an embodiment, the designing, based on the reverse-reconstructed worn surface, machining trajectories for repairing the worn freeform surface, and combining, according to the distribution condition of the original normal vectors, positions and initial normal vectors of discrete trajectory points of the machining trajectories, to obtain 6-dimensional machining position and normal vector trajectory data includes: designing, based on the reverse-reconstructed worn surface, the machining trajectories for repairing the worn freeform surface; traversing the discrete trajectory points of the machining trajectories to extract an original normal vector set corresponding to the adjacent point set of each of the discrete trajectory points; calculating a unit average vector of the original normal vector set, and taking the unit average vector as an initial normal vector of the discrete trajectory point to thereby obtain the initial normal vectors of the discrete trajectory points; and combining, according to the distribution condition of the original normal vectors, the positions and the initial normal vectors of the discrete trajectory points of the machining trajectories, to obtain the 6-dimensional machining position and normal vector trajectory data.

In an embodiment, the establishing a trajectory plane of each of the machining trajectories, and obtaining, by introducing a normal vector rotation angle and using a polynomial fitting noise reduction method with a sliding window, optimized machining position and normal vector trajectory data includes: establishing, based on the 6-dimensional machining position and normal vector trajectory data, the trajectory plane of each of the machining trajectories; performing planar projection on the initial normal vectors of the discrete trajectory points of the machining trajectories; calculating, by introducing the normal vector rotation angle, initial normal vector rotation angles at the discrete trajectory points; performing fitting denoising on the initial normal vector rotation angles to remove jitter of the initial normal vectors caused by microscopic pits and protrusions on the worn freeform surface; and reverse-solving optimized normal vector rotation angles after regression denoising, and obtaining the optimized machining position and normal vector trajectory data.

In an embodiment, the fitting, by introducing a 6-dimensional NURBS curve, discrete position and posture data of the robot to generate high-precision, smooth and synchronous motion position and posture trajectories of the robot includes: processing the optimized machining position and normal vector trajectory data to obtain the discrete position and posture data for motion control of the robot; and fitting, by introducing the 6-dimensional NURBS curve, the discrete position and posture data of the robot to generate the high-precision, smooth and synchronous motion position and posture trajectories of the robot.

In an embodiment, the adaptively segmenting, based on curvatures of the motion position and posture trajectories in a position space and a posture space, the motion position and posture trajectories into hazardous segments and safe segments, and assigning processing velocities to the hazardous segments and the safe segments includes: calculating, based on the motion position and posture trajectories, the curvatures of the motion position and posture trajectories in the position space and the posture space; segmenting, based on a given curvature threshold, the motion position and posture trajectories obtained after NURBS fitting into the hazardous segments and the safe segments; and assigning the processing velocities to the hazardous segments and the safe segments, so as to avoid causing mechanical shocks in areas with excessive curvatures in the position space and the posture space, thereby ensuring smoothness and stability of a position motion and a posture motion during the laser repair process.

In an embodiment, the Step 7 includes the following steps: for segmented motion position and posture trajectories obtained after the adaptively segmenting and stored in a trajectory buffer queue:

storing adjacent segments of a current processing segment in a look-ahead window; performing the backward deceleration iteration and the forward acceleration iteration to coordinate look-ahead results of the motion position and posture trajectories and thereby obtain the node velocities of the hazardous segments and the node velocities of the safe segments, so as to realize the rapid and smooth transition of the processing velocities of the safe segments and the dangerous segments in the position space and the posture space, and ensure synchronous, fast and smooth velocity switching between a position motion and a posture motion in a process of motion control interpolation.

In an embodiment, the posture optimization and following control method for a robot used in freeform surface repair further includes: controlling, based on the node velocities of the hazardous segments and the node velocities of the safe segments, the robot to move on the worn freeform surface along the motion position and posture trajectories to complete the laser repair process.

In another aspect, an embodiment of the present disclosure provides posture optimization and follow-up control system for a robot used in freeform surface repair, which includes: a worn surface reverse modeling module, a worn surface initial normal vector calculation module, an initial machining trajectory and normal vector extraction module, a normal vector rotation angle polynomial regression denoising module, a machining trajectory position and posture NURBS fitting module, a position and posture trajectory curvature adaptive segmentation module, a segmented trajectory position and posture synchronization acceleration and deceleration look-ahead module, and a robotic motion and laser process coordinated control module.

The worn surface reverse modeling module is configured to: collect a contour of a worn freeform surface, perform reverse modeling of the worn freeform surface to obtain a reverse-reconstructed worn surface, and obtain a size, a shape and microscopic surface topography characteristics of the worn freeform surface.

The worn surface initial normal vector calculation module is configured to: perform statistical calculation to obtain three-dimensional distribution characteristics of discrete points on the reverse-reconstructed worn surface, and calculate original normal vectors of the discrete points of the reverse-reconstructed worn surface.

The initial machining trajectory and normal vector extraction module is configured to: design, based on requirements of a laser repair process, machining trajectories for repairing the worn freeform surface, and generate, based on the original normal vectors, 6-dimensional machining position and normal vector trajectory data.

The normal vector rotation angle polynomial regression denoising module is configured to: perform, based on the 6-dimensional machining position and normal vector trajectory data and by introducing a normal vector rotation angle and using a polynomial fitting noise reduction method with a sliding window, fitting denoising on the original normal vectors, to remove jitter of initial normal vectors caused by microscopic pits and protrusions on the worn freeform surface and thus ensure reachability and smoothness of a processing trajectory posture.

The machining trajectory position and posture NURBS fitting module is configured to: fit, by introducing 6-dimensional NURBS curve, the optimized machining position and normal vector trajectory data, to generate high-precision, smooth, and continuous motion position and posture trajectories of the robot for precise and synchronized robot position and posture control during the laser repair process The position and posture trajectory curvature adaptive segmentation module is configured to: calculate curvatures of the motion position and posture trajectories in a position space and a posture space, perform adaptive curvature segmentation on the motion position and posture trajectories to obtain hazardous segments and safe segments, and assign appropriate processing velocities to the hazardous segments and the safe segments, to ensure smooth and stable motion of position and posture motion during the laser repair process.

The segmented trajectory position and posture synchronization acceleration and deceleration look-ahead module is configured to: perform a backward deceleration iteration and a forward acceleration iteration to obtain node velocities of the hazardous segments and node velocities of the safe segments, so as to realize the rapid and smooth transition of the processing velocities of the safe segments and the dangerous segments, and ensure synchronous, fast and smooth velocity switching between a position motion and a posture motion in a process of motion control interpolation.

The robotic motion and laser process coordinated control module is configured to: calculate a scanning velocity of a laser cladding nozzle relative to the worn surface, and dynamically adjust laser cladding process parameters online, to ensure thermodynamic stability of a laser cladding molten pool in the laser repair process and improve quality of laser cladding repair.

In an embodiment, each of the worn surface reverse modeling module, the worn surface initial normal vector calculation module, the initial machining trajectory and normal vector extraction module, the normal vector rotation angle polynomial regression denoising module, the machining trajectory position and posture NURBS fitting module, the position and posture trajectory curvature adaptive segmentation module, the segmented trajectory position and posture synchronization acceleration and deceleration look-ahead module, and the robotic motion and laser process coordinated control module is embodied by at least one processor and at least one memory coupled to the at least one processor, and the at least one memory stores computer programs executable by the at least one processor.

The present disclosure has at least technical effects as follows.

The present disclosure addresses the issues in the freeform surface repair scenario, an actual workpiece undergoes significant changes in macroscopic shape and size, and lacks an accurate model for reference. Additionally, considering that a worn surface of the actual workpiece is covered with numerous tiny pits and protrusions, the present disclosure solves the problem of lower processing quality caused by fluctuation of a surface normal vector of the worn surface. Moreover, the present disclosure overcomes the challenge of a severe mechanical shock in an area with an excessive local curvature when using a traditional constant processing velocity, thereby achieving dynamic adjustment and smooth control of posture of a laser cladding nozzle during a repair process, thereby improving the surface quality of the repair processing.

Compared with the related art, the present disclosure performs a reverse reconstruction method for the worn freeform surface to obtain a size, a shape, and microscopic surface morphology characteristics of the actual workpiece, thereby more accurately reflecting the wear state of the actual workpiece. Further, fully considering that in a wear scene, a surface of the actual workpiece is covered with numerous tiny pits and protrusions, if the laser cladding nozzle is strictly maintained perpendicular to the surface to be machined, it will cause severe posture jitters of the robot during the laser cladding process. This will seriously affect smoothness and stability of a repair motion, ultimately leading to a significant decline in processing quality. As such, the present disclosure proposes a method of polynomial regression denoising of normal vector rotation angles with a sliding window, which can overcome the fluctuation of the normal vector caused by the tiny pits and the protrusions, while ensuring that the laser cladding nozzle remains dynamically perpendicular to a processing surface to the greatest extent possible. Furthermore, considering that the curvature of the freeform surface processing trajectory varies in both position and posture spaces, a fitted non-uniform rational b-splines (NURBS) processing trajectory is adaptively divided into safe and hazardous segments, with appropriate processing velocities assigned to the safe and hazardous segments. Based on a S-curve acceleration and deceleration rule, the present disclosure achieves rapid and smooth velocity transitions between segmented trajectories in both position and posture spaces, ensuring high-precision, stable, and rapid robotic laser cladding processing motion. Additionally, during the laser repair process, a scanning velocity of the laser nozzle relative to the worn surface is calculated online, and laser cladding process parameters are dynamically adjusted to ensure the thermodynamic stability of a laser cladding pool during processing, thereby further improving the quality of laser cladding repair.

BRIEF DESCRIPTION OF DRAWINGS

Accompanying drawings generally illustrate various embodiments by way of example and not limitation, and the accompanying drawings together with the description and claims serve to explain embodiments of the present disclosure. Where appropriate, the same reference numerals are used throughout the accompanying drawings to refer to the same or similar parts. These embodiments are illustrative and are not intended to be exhaustive or exclusive embodiments of the apparatus or method of the present disclosure.

DETAILED DESCRIPTION OF EMBODIMENTS

It should be noted that embodiments in the present disclosure and features in the embodiments can be combined with each other without conflict. The present disclosure will be described in detail with reference to the accompanying drawings and the embodiments.

Figure 1:
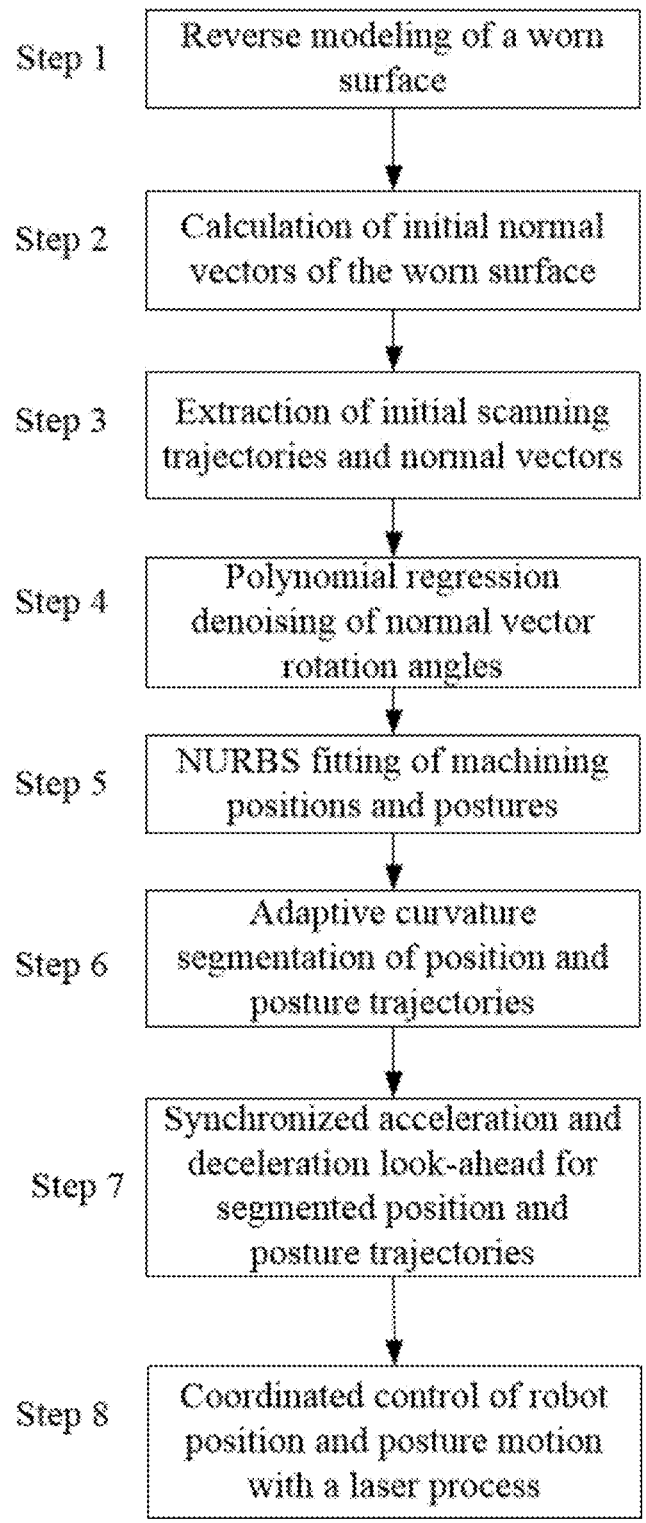
FIG. 1 illustrates a flowchart of a posture optimization and following control method for a robot used in freeform surface repair according to an embodiment of the present disclosure.

The present disclosure provides a posture optimization and following control method for a robot used in freeform surface repair to realize dynamic adjustment and smooth control of a posture of a laser cladding nozzle in a laser repair process. As shown in FIG. 1, firstly, a robot is driven to carry a line laser sensor to collect a three-dimensional (3D) data of a worn surface, and an 3D point cloud model (i.e., reverse-reconstructed worn surface) of the worn surface is obtained by performing reverse modeling, so as to obtain a detailed macroscopic shape, a size and microscopic surface appearance information (i.e., microscopic surface topography characteristics) of the worn surface. Furthermore, according to a given adjacent radius, an adjacent point set of each of discrete points on the reverse-reconstructed worn surface is obtained. Statistical calculation is performed to obtain a three-dimensional covariance matrix of the adjacent point set to obtain original normal vectors of the reverse-reconstructed worn surface. Further, based on the original normal vectors of the reverse-reconstructed worn surface, initial normal vectors of discrete trajectory points of given machining trajectories are obtained; and positions of discrete trajectory points of the machining trajectories and the initial normal vectors of discrete trajectory points of the machining trajectories are combined to obtain 6-dimensional initial machining trajectory positions and normal vector data set, i.e., 6-dimensional machining position and normal vector trajectory data. Further, based on a position and normal vector data set of each machining trajectory, a working plane of the current scanning trajectory is fitted. A normal vector rotation angle at each discrete point is calculated. By employing a proposed polynomial regression method with a sliding window, fitting and denoising of the normal vector rotation angles at discrete points are realized remove jitter of the initial normal vectors caused by microscopic pits and protrusions on the worn freeform surface.

Further, based on optimized machining position and normal vector information (i.e., optimized machining position and normal vector trajectory data), discrete position and posture trajectory points (i.e., discrete position and posture data of the robot) are fitted to generate smooth, continuous, and synchronized position and posture machining trajectories using (i.e., motion position and posture trajectories of the robot) a 6-dimensional NURBS interpolation fitting method. Further, based on curvatures of the motion position and posture trajectories in a position space and a posture space, the motion position and posture trajectories are adaptively segmented into hazardous segments and safe segments, and assigning processing velocities to the hazardous segments and the safe segments, to avoid causing mechanical shocks in areas with excessive curvatures in the position space and the posture space. Further, based on a position and posture synchronous look-ahead algorithm based on S-curve acceleration and deceleration, a backward deceleration iteration and a forward acceleration iteration are performed, to realize rapid and smooth transition of the processing velocities of the safe segments and the dangerous segments in the position space and the posture space. Further, in the laser repair process, by dynamically monitoring an actual movement velocity of the robot and adjusting laser cladding process parameters online, thermodynamic stability of a laser cladding molten pool in the laser repair process is ensured and the quality of laser cladding repair is improved.

Specific steps of reverse modeling of the worn surface in step 1 of FIG. 1 are as follows.

Figure 2:
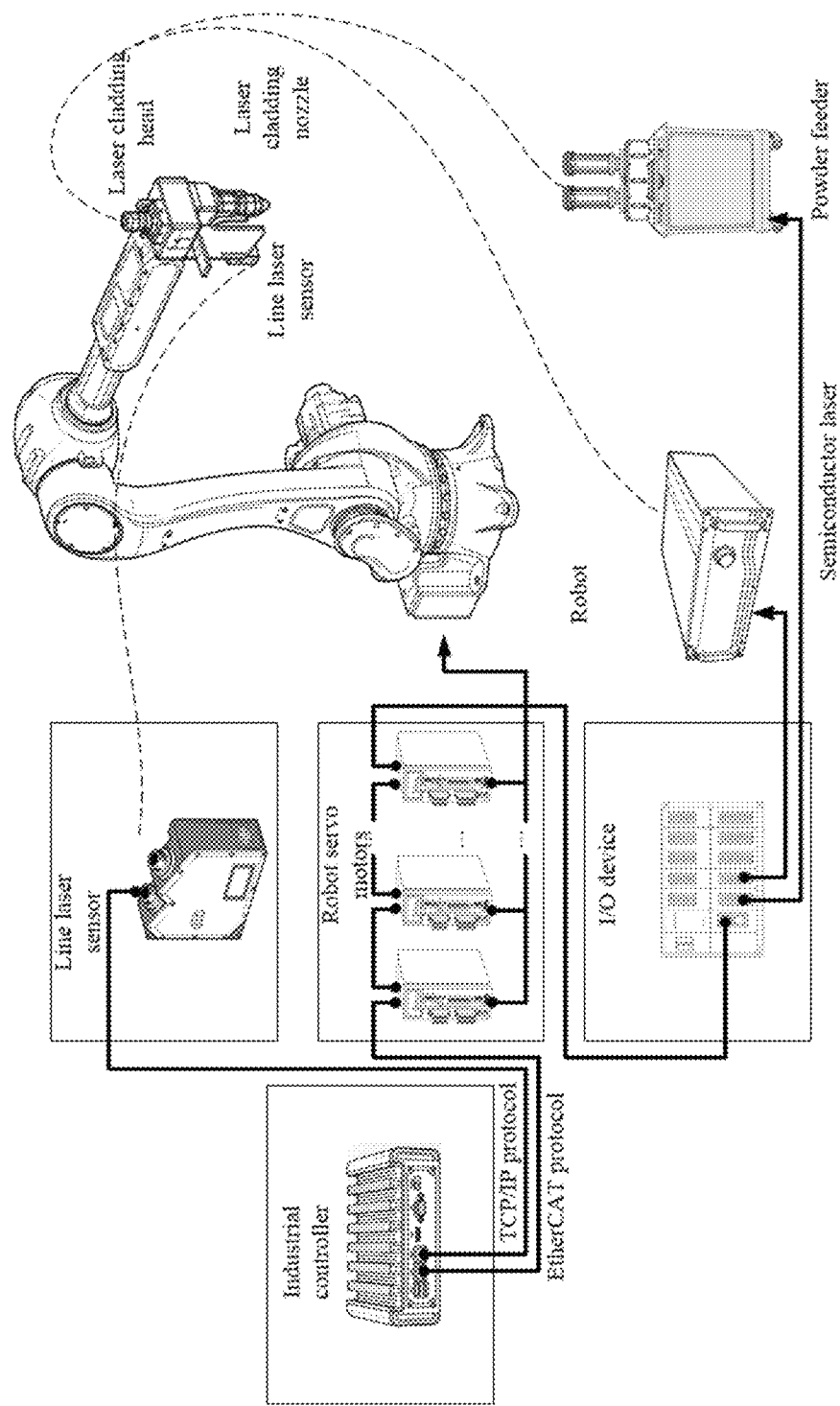
FIG. 2 illustrates a schematic structural diagram of a robotic laser cladding system for freeform surface repair.

As shown in FIG. 2, a robotic laser cladding system for freeform surface repair includes: an industrial controller, a line laser sensor, a robot servo motor, a robot, an input/output (I/O) device, a semiconductor laser, a powder feeder, a laser cladding head, a laser cladding nozzle, and an auxiliary device. The line laser sensor and laser cladding head are installed at an end of the robot. The industrial controller is configured to control states of the robot servo motor and the I/O device in real time through an ethernet for control automation technology (EtherCAT) protocol. Further, a digital analog signal from the I/O device is used to trigger start and stop of the semiconductor laser and the powder feeder and is used to trigger change of working parameters of the semiconductor laser and the powder feeder. At the same time, the controller establishes communication with the line laser sensor through a transmission control protocol/internet protocol (TCP/IP) protocol, and is configured to realize online control of the line laser sensor and real-time uploading of a collected contour.

Figure 3:
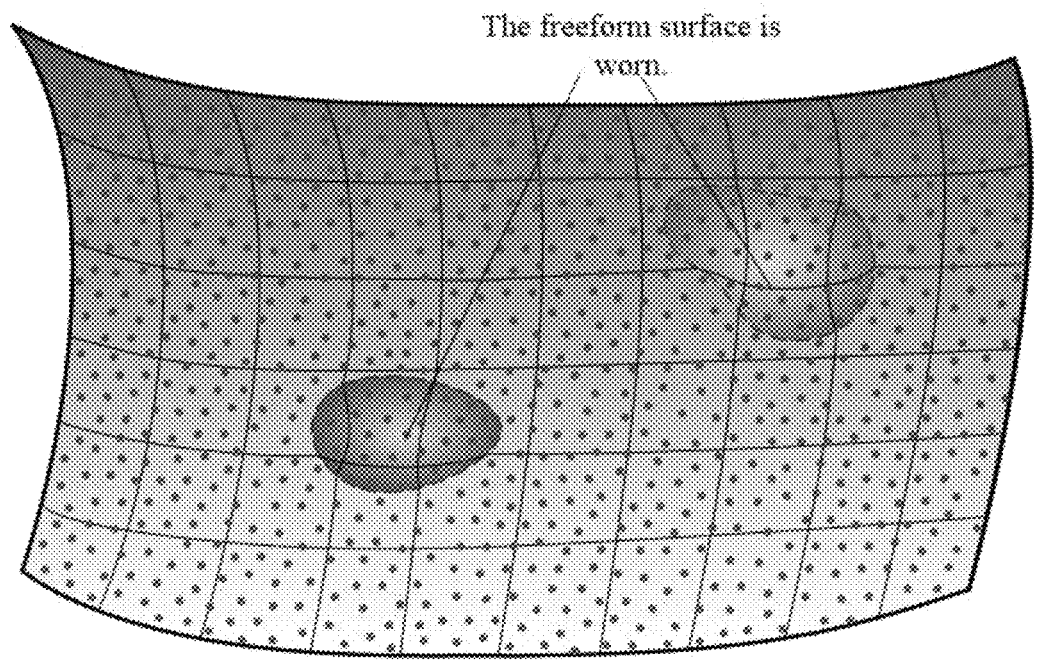
FIG. 3 illustrates a schematic view of a worn surface.

By driving the robot to move with the line laser sensor, a surface of a worn workpiece is scanned, then a shape of a contour of the surface of the worn workpiece is collected periodically, and reverse reconstruction of the worn workpiece is completed to obtain a reverse-reconstructed worn surface, which provides model guidance for later surface repair. As shown in FIG. 3, the worn surface consists of discrete point cloud data M, and there are irregular pits and protrusions on the reverse-reconstructed worn surface due to irregular wear in service engineering of the worn workpiece. By on-line scanning with the line laser sensor, a macro shape and size parameters of the worn workpiece can be obtained, and information such as pits and protrusions on a micro surface can also be retained, therefore, real characteristics of the worn workpiece can be described more accurately.

In Step 2 of FIG. 1, initial normal vectors of the reverse-reconstructed worn surface are calculated, which includes followings steps.

Figure 4:
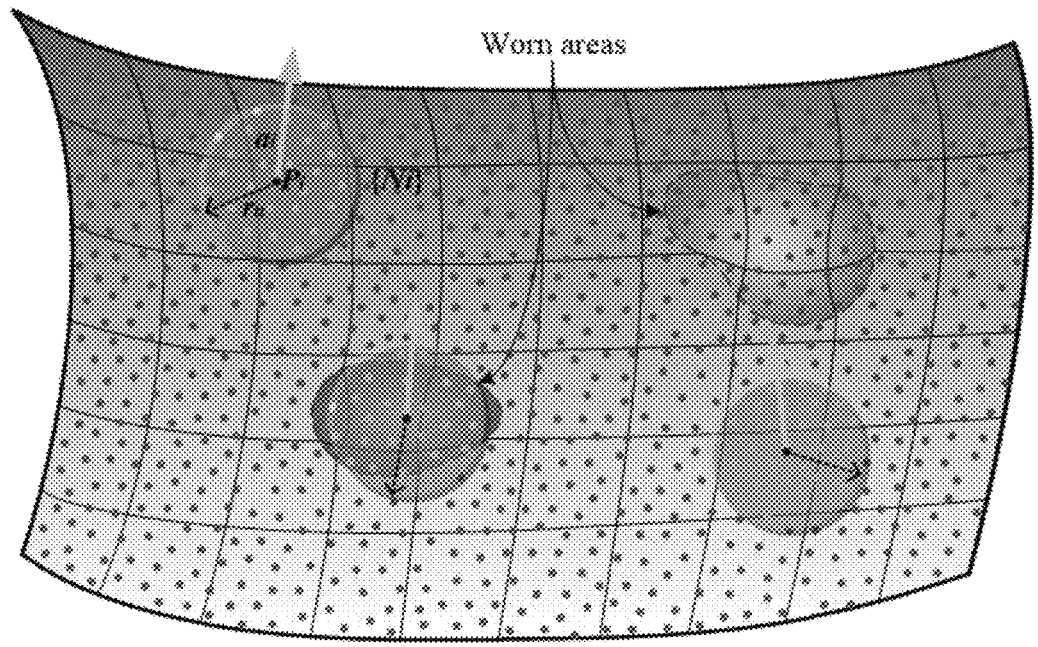
FIG. 4 illustrates a schematic diagram of calculation of an initial normal vector.

Properly sparsification and denoising are performed on the point cloud of the actual reverse-reconstructed worn surface with a given machining accuracy $\delta_{error}$, and subsequent initial normal vector calculation burden is reduced by simplifying a point cloud model. Furthermore, according to a given adjacent radius $r_n$, an adjacent point set $\{N_j\}$ of each discrete point $P_i$ on the reverse-reconstructed point cloud (i.e., the reverse-reconstructed worn surface) is obtained, as shown in FIG. 4. A three-dimensional covariance matrix $E_i$ of the adjacent point set $\{N_j\}$ is obtained by a statistical analysis method, and specific calculation formulas for the three-dimensional covariance matrix $E_i$ are as follows:

$$E_i = \begin{bmatrix} \text{cov}(x,x) & \text{cov}(x,y) & \text{cov}(x,z) \\ \text{cov}(y,x) & \text{cov}(y,y) & \text{cov}(y,z) \\ \text{cov}(z,x) & \text{cov}(z,y) & \text{cov}(z,z) \end{bmatrix}$$

$$N_j = (x_j, y_j, z_j) \in \{N_j \mid \overline{N_jP_i} < r_n, N_j \in M\},$$

$$\begin{cases} \text{cov}(x,x) = \dfrac{\sum_{j=1}^{n}(x_j-\bar{x})*(x_j-\bar{x})}{n-1} \\ \text{cov}(y,y) = \dfrac{\sum_{j=1}^{n}(y_j-\bar{y})*(y_j-\bar{y})}{n-1} \\ \text{cov}(z,z) = \dfrac{\sum_{j=1}^{n}(z_j-\bar{z})*(z_j-\bar{z})}{n-1} \\ \text{cov}(x,y) = \text{cov}(y,x) = \dfrac{\sum_{j=1}^{n}(x_j-\bar{x})*(y_j-\bar{y})}{n-1} \\ \text{cov}(x,z) = \text{cov}(z,x) = \dfrac{\sum_{j=1}^{n}(x_j-\bar{x})*(z_j-\bar{z})}{n-1} \\ \text{cov}(y,z) = \text{cov}(z,y) = \dfrac{\sum_{j=1}^{n}(y_j-\bar{y})*(z_j-\bar{z})}{n-1} \end{cases}$$

Furthermore, singular value decomposition (SVD) is performed on the three-dimensional covariance matrix $E_i$ of the adjacent point sets $\{N_j\}$, a minimum eigenvector of the three-dimensional covariance matrix $E_i$ is obtained and unitized, which is the initial normal vector $a_i$ at a current discrete point. By iterating the above algorithm, the initial normal vector $\{a_i\}$ of all discrete points of the reverse-reconstructed worn surface can be obtained.

In Step 3 of FIG. 1, initial scanning trajectories and initial normal vectors are extracted, which includes the following steps.

Figure 5:
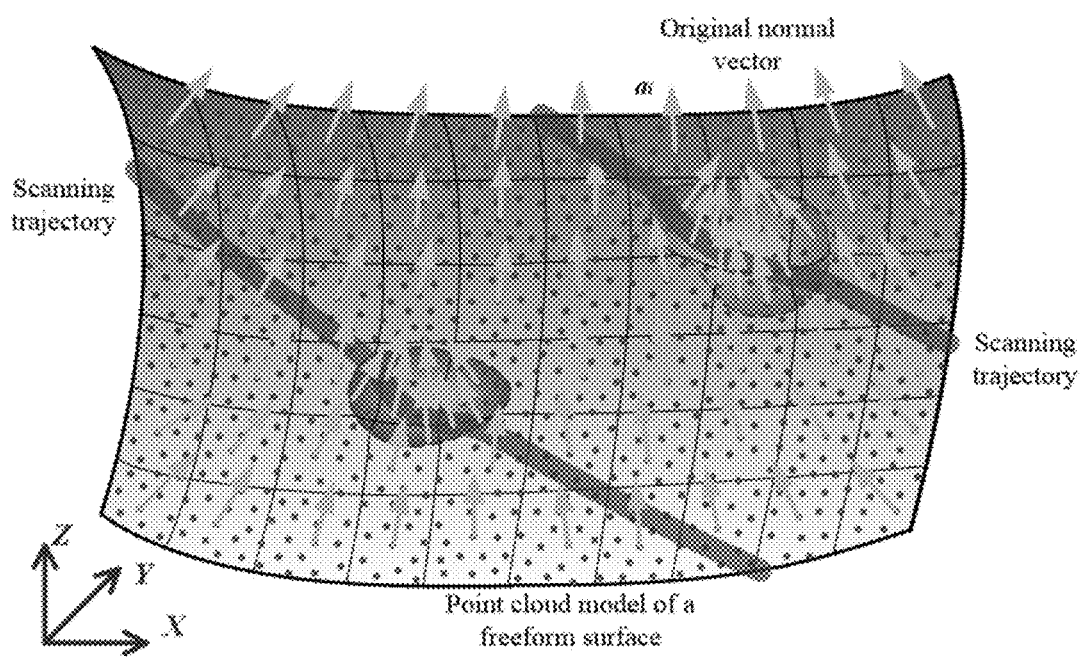
FIG. 5 illustrates a schematic diagram of a scanning trajectory position and a normal vector.

Based on the actual reverse-reconstructed point cloud model and referring to machining parameters of freeform surface workpiece repair, machining trajectories for repairing the worn freeform surface are designed and planned, as shown in FIG. 5. According to position coordinate information of the planned machining trajectories, a normal vector set $\{a_k\}$ corresponding to an adjacent point set $\{N_k\}$ of each discrete trajectory point $P_i$ on the actual reverse-reconstructed point cloud model is obtained. An average vector of the normal vector set $\{a_k\}$ is calculated and is normalized, and thus an initial normal vector $a_i'$ corresponding to the current discrete trajectory point $P_i$ is obtained. A specific calculation process is as follows:

$$\begin{cases} \overline{x_{a_i}} = \dfrac{\sum_{k=1}^{n} x_{a_k}}{n} \\ \overline{y_{a_i}} = \dfrac{\sum_{k=1}^{n} y_{a_k}}{n} \\ \overline{z_{a_i}} = \dfrac{\sum_{k=1}^{n} z_{a_k}}{n} \\ a_i' = \dfrac{(\overline{x_{a_i}}, \overline{y_{a_i}}, \overline{z_{a_i}})}{\left|(\overline{x_{a_i}}, \overline{y_{a_i}}, \overline{z_{a_i}})\right|} \end{cases}$$

where $a_k = (x_{a_k}, y_{a_k}, z_{a_k}) \in \{a_k\}$, The position coordinates $P_i = (x_{P_i}, y_{P_i}, z_{P_i})$ and the initial normal vector $a_i' = (x_{a_i'}, y_{a_i'}, z_{a_i'})$ of the current trajectory point are combined to form 6-dimensional machining position and normal vector trajectory data $O_k=(x_{P_i}, y_{P_i}, z_{P_i}, x_{a_i'}, y_{a_i'}, z_{a_i'})$, which is used as position and normal vector information of an initial planned trajectory for later trajectory fitting and interpolation.

In Step 4 of FIG. 1, polynomial regression denoising based on normal vector rotation angles is performed, which includes the following steps.

In order to quantify a rate of change of a normal vector of the laser cladding nozzle on each machining trajectory in the laser repair process, a normal vector rotation angle is introduced, and then sliding polynomial regression of the normal vector rotation angle is carried out to realize smooth noise reduction of posture angles and remove the jitter of the initial normal vector caused by microscopic pits and protrusions on the worn freeform surface.

Figure 6:
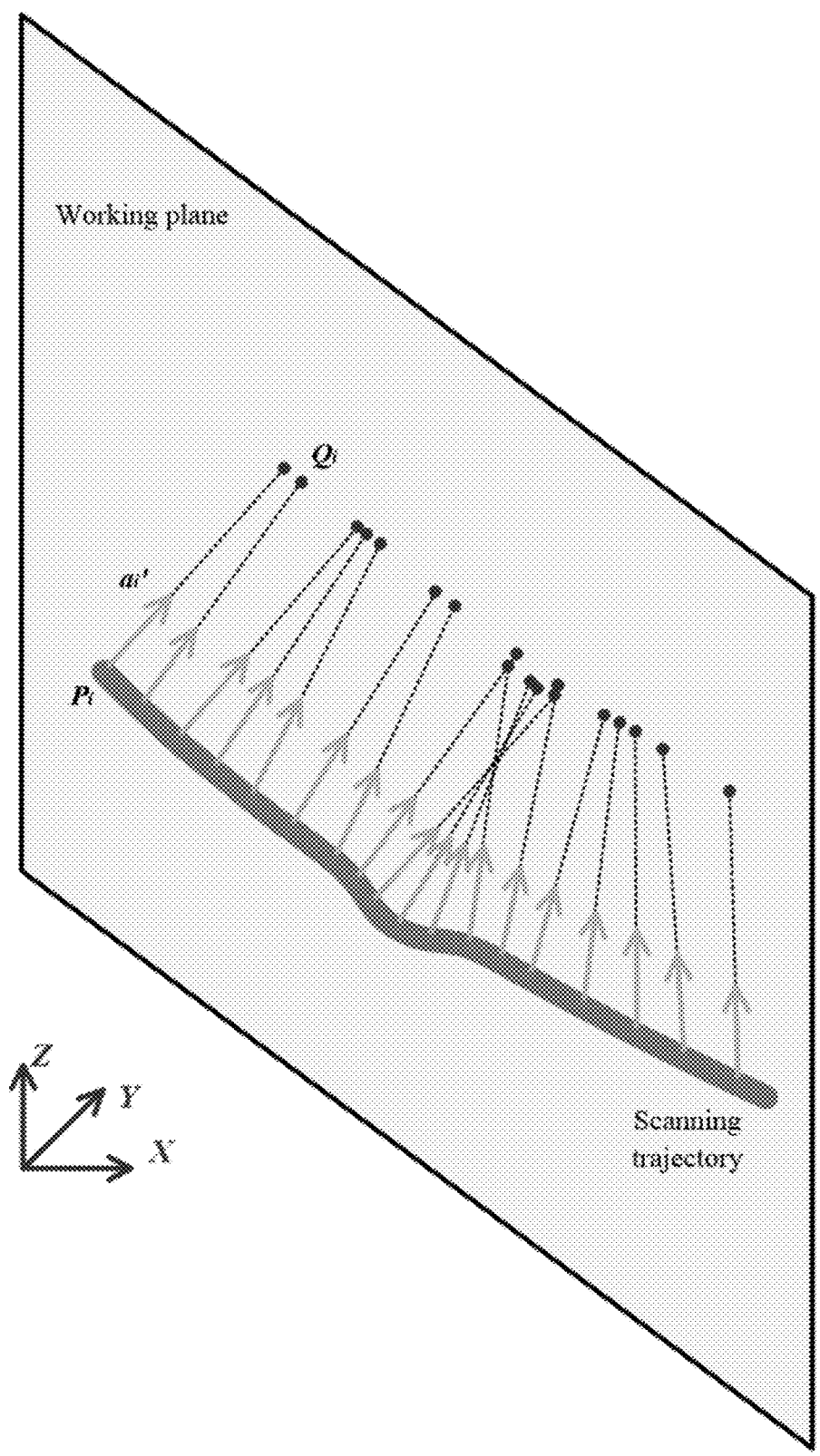
FIG. 6 illustrates a schematic diagram of establishment of a trajectory plane.

Firstly, according to the position and normal vector information of the initial planned trajectory, a working plane of each machining trajectory is established. By translating the discrete trajectory point $P_i$ on a scanning trajectory along the initial normal vector $a_i'$ of the current point by a distance l, an offset point $Q_i$ is obtained, as shown in FIG. 6, which can be specifically calculated by the following formula as follows:

$$Q_i = P_i + l a_i'.$$

Figure 7:
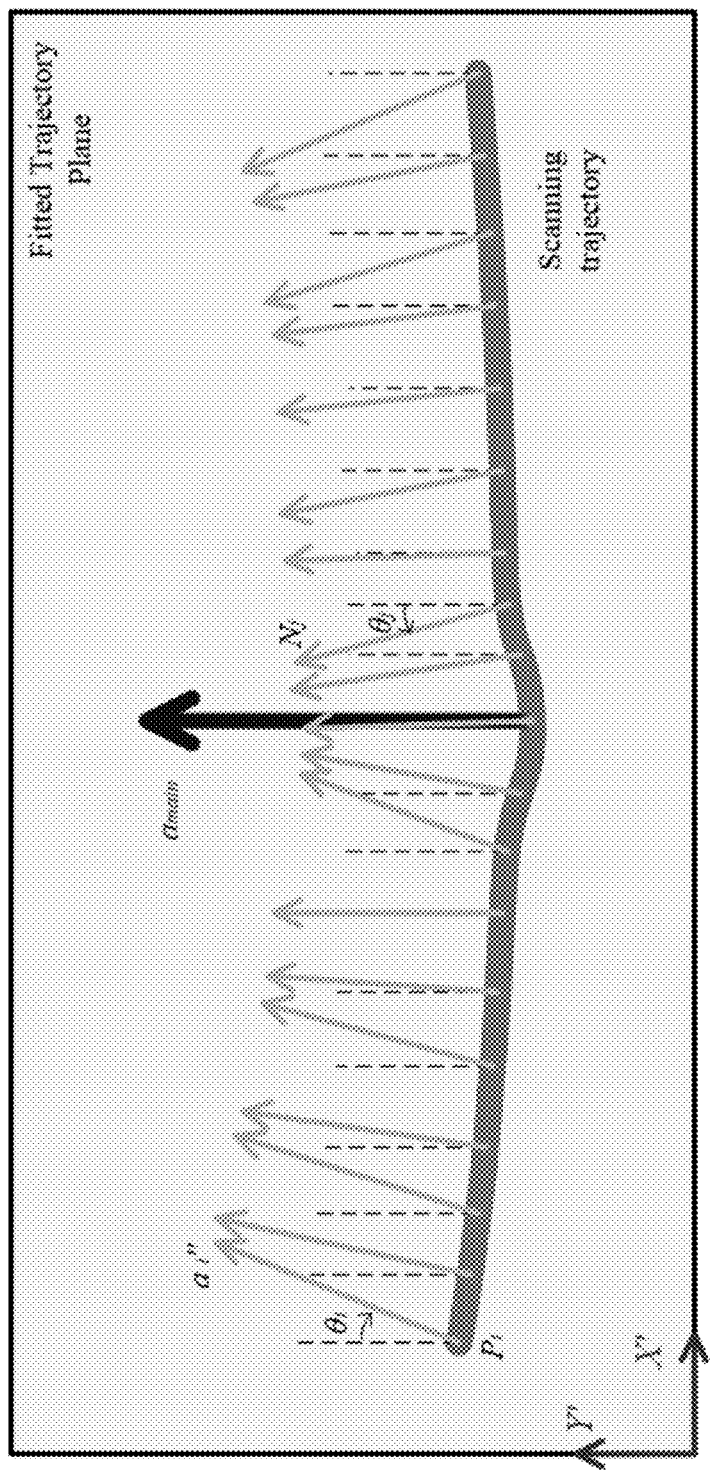
FIG. 7 illustrates a schematic diagram of calculation of a rotation angle of a projection normal vector.
Figure 8:
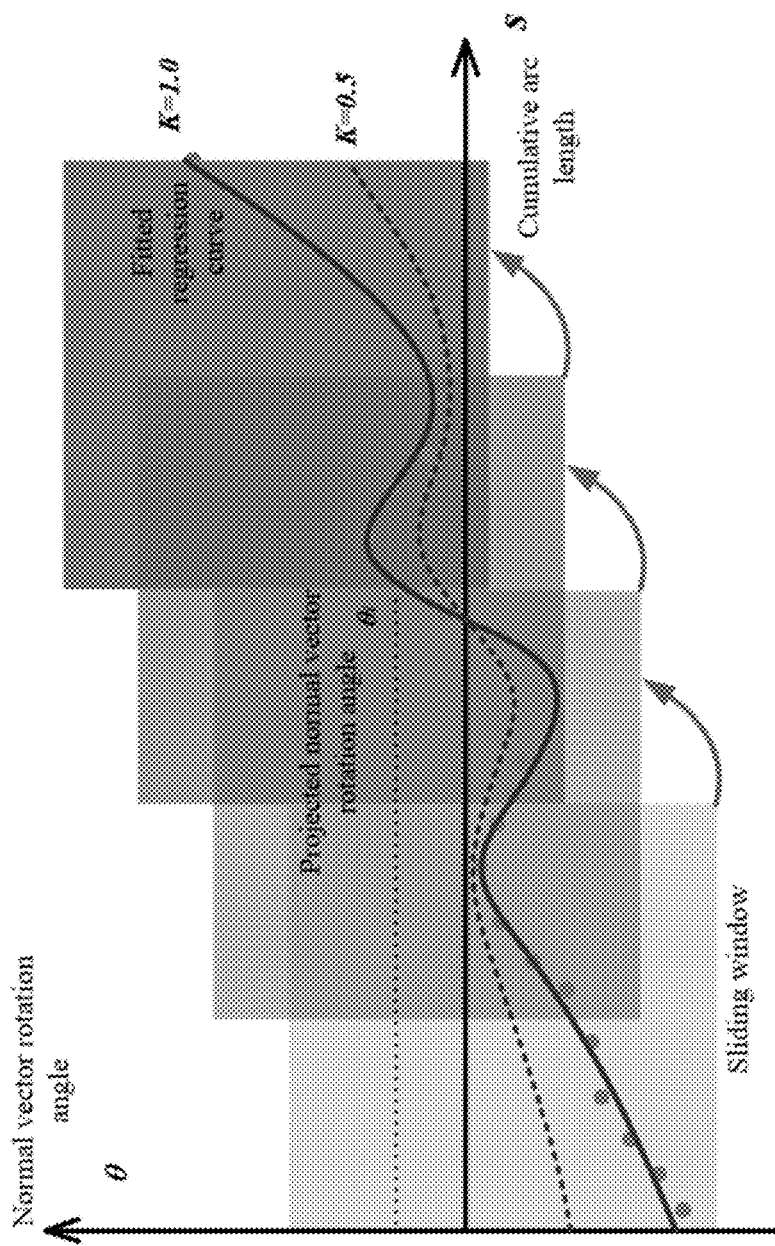
FIG. 8 illustrates a schematic diagram of a polynomial regression noise reduction with a sliding window.

Furthermore, the discrete trajectory points $\{P_i\}$ of each scanning trajectory and a corresponding offset point set $\{Q_i\}$ are combined as an object for plane fitting. It may be assumed that a trajectory plane equation is $Ax+By+Cz+D=0$, and parameters A, B, C, D of the current trajectory plane can be obtained through iterative calculation by using a least square method. Then the initial normal vector is projected on the current trajectory plane, and a normal vector $a_i''$ with plane constraint can be obtained. An average vector of a projected normal vector set $\{a_i''\}$ is calculated and is normalized as a reference main normal vector $a_{main}$ of the current machining trajectory, as shown in FIG. 7. Further, an included angle $\theta_i$ between the projected normal vector $a_i''$ and the reference main normal vector $a_{main}$ at each discrete trajectory point of the current scanning trajectory is denoted as a normal vector rotation angle, and two-dimensional data of a cumulative arc length $S_i$ and the normal vector rotation angle $\theta_i$ is established. The specific calculation method is as follows:

$$\begin{cases} \theta_i = \arcsin \dfrac{|a_i'' \times a_{main}|}{|a_i''||a_{main}|} \\ S_i = \sum_{j=1}^{i-1} |P_j P_{j+1}| \end{cases}$$

By using a polynomial regression method with a sliding window, a polynomial fitting curve parameter in a current sliding window are obtained by using the least square method, which is recorded as $$\theta = \sum_{i=0}^{n} C_i s^i.$$

Figure 9:
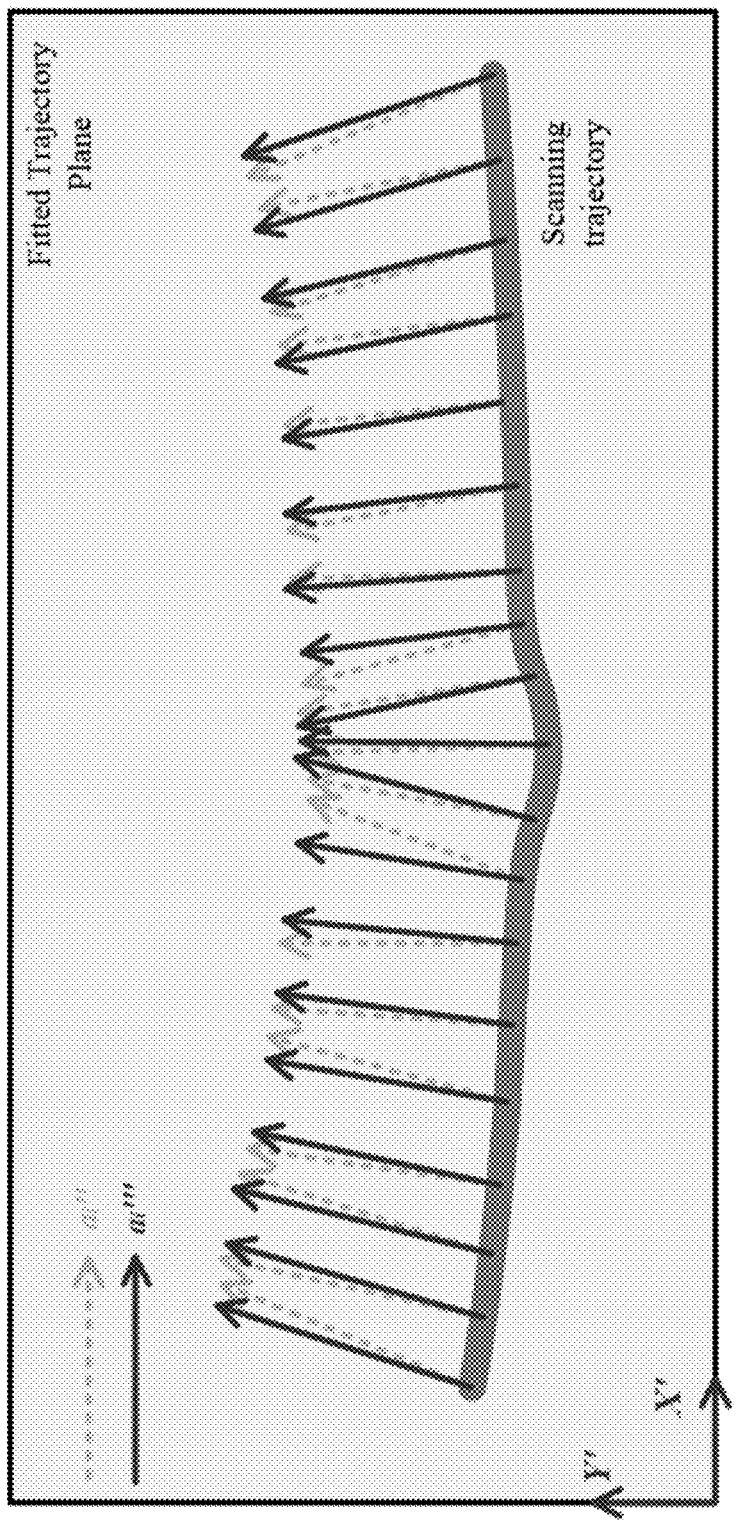
FIG. 9 illustrates a schematic diagram of a normal vector before and after optimization.

Further, in order to prevent the problem that the robot's machining position and posture can't be reached because the normal rotation angle is too large, a linear constraint coefficient K is added to realize the constraint of excessive posture change, and finally an optimized normal vector $a_i'''$ is obtained by inverse solution according to an optimized projected normal rotation angle $$\theta' = K \sum_{i=0}^{n} C_i s^i,$$

as shown in FIG. 9. The polynomial regression denoising method based on normal vector rotation angle can ensure that the laser cladding nozzle is perpendicular to the worn freeform surface to the greatest extent during the laser repair process, and further restrict a maximum rotation angle of the laser cladding nozzle, so as to realize the smooth noise reduction of the posture angles, remove the jitter of the initial normal vectors caused by microscopic pits and protrusions on the worn freeform surface, and ensure the accessibility and stability of the machining trajectory postures.

In Step 5, NURBS fitting of machining positions and postures is performed, which includes the following steps.

Figure 10:
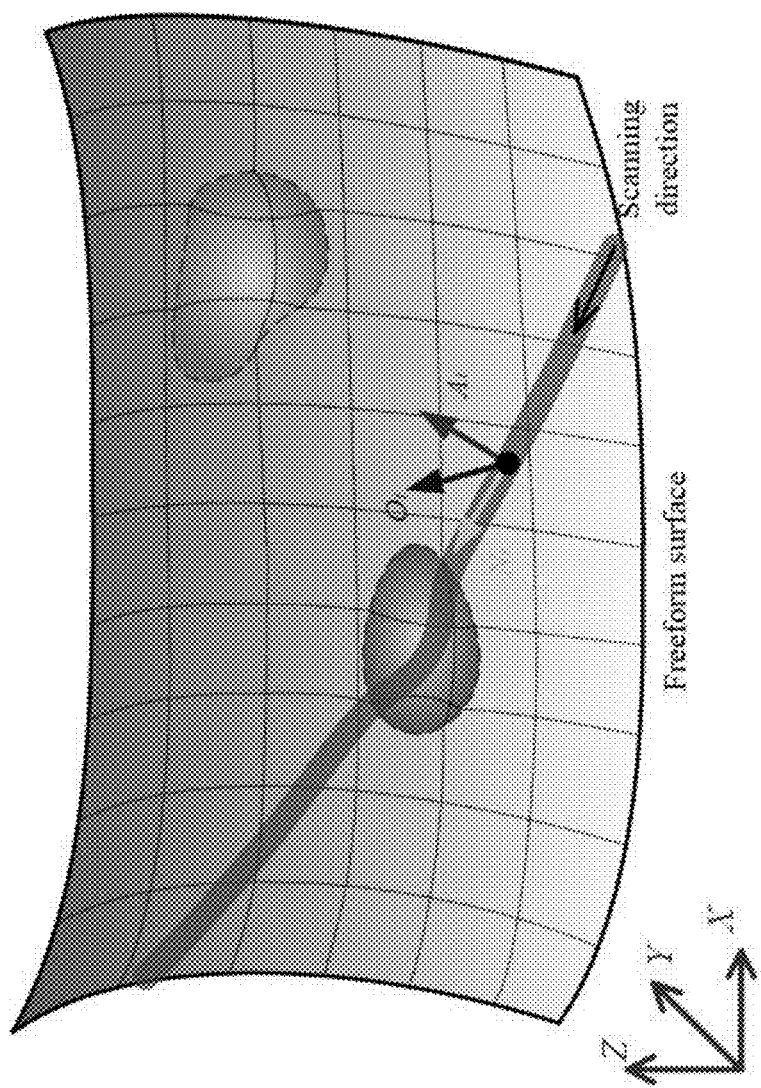
FIG. 10 illustrates a schematic diagram of generation of an optimized posture of a machining trajectory.

Firstly, according to the optimized normal vector $a_i'''$ and the planned discrete trajectory point $P_i$, a trajectory tangent vector $N_i$, an optimized normal vector $A_i$ and a derived vector $O_i$ are obtained, and then a posture matrix $R_i$ of the robot is calculated, which can be calculated by the following formula:

$$R_i = [N_i \ O_i \ A_i] = \begin{bmatrix} x_{N_i} & x_{O_i} & x_{A_i} \\ y_{N_i} & y_{O_i} & y_{A_i} \\ z_{N_i} & z_{O_i} & z_{A_i} \end{bmatrix} = \begin{bmatrix} c\alpha c\beta & c\alpha s\beta s\gamma - s\alpha c\gamma & c\alpha s\beta c\gamma + s\alpha s\gamma \\ s\alpha c\beta & s\alpha s\beta s\gamma + c\alpha c\gamma & s\alpha s\beta c\gamma - c\alpha s\gamma \\ -s\beta & c\beta s\gamma & c\beta c\gamma \end{bmatrix}$$

where the trajectory tangent vector $$N_i = \frac{P_i P_{i+1}}{|P_i P_{i+1}|},$$

the optimized normal vector $A_i = a_i'''$, and the derived vector $O_i = A_i \times N_i$ are shown in FIG. 10. Then, according to a relationship between an Euler angle and the posture matrix of the robot in the above formula, a final optimized trajectory point position and posture coordinate $D_i = [D_{i_1}, D_{i_2}] = [x_{P_i}, y_{P_i}, z_{P_i}, \alpha_i, \beta_i, \gamma_i]$ can be obtained.

A 6-dimensional NURBS curve is introduced, and the finally optimized trajectory point position and posture coordinate $[D_{i_1}, D_{i_2}]$ is interpolated and fitted to obtain a high-order continuous robot machining position and posture trajectory, which is specifically obtained by the following formula:

$$C(u) = [C_1(u), C_2(u)] = [x(u), y(u), z(u), \alpha(u), \beta(u), \gamma(u)] = \frac{\sum_{i=0}^{n} w_i D_i N_{i,k}(u)}{\sum_{i=0}^{n} w_i N_{i,k}(u)}$$

where $w_i$ represents a weight of each discrete trajectory point, $D_i$ represents a position and posture coordinate of each discrete trajectory point, and $N_{i,k}(u)$ represents a k-order B-spline basis function, which is specifically calculated by the following formula:

$$\begin{cases} N_{i,0} = \begin{cases} 1, & u_i \le u \le u_{i+1} \\ 0, & \text{Others} \end{cases} \\ N_{i,k}(u) = \dfrac{u - u_i}{u_{i+k+1} - u} N_{i,k-1}(u) + \dfrac{u_{i+k} - u}{u_{i+k} - u_{i+1}} N_{i+1,k-1}(u) \\ \dfrac{0}{0} = 0 \end{cases}$$

Figure 11:
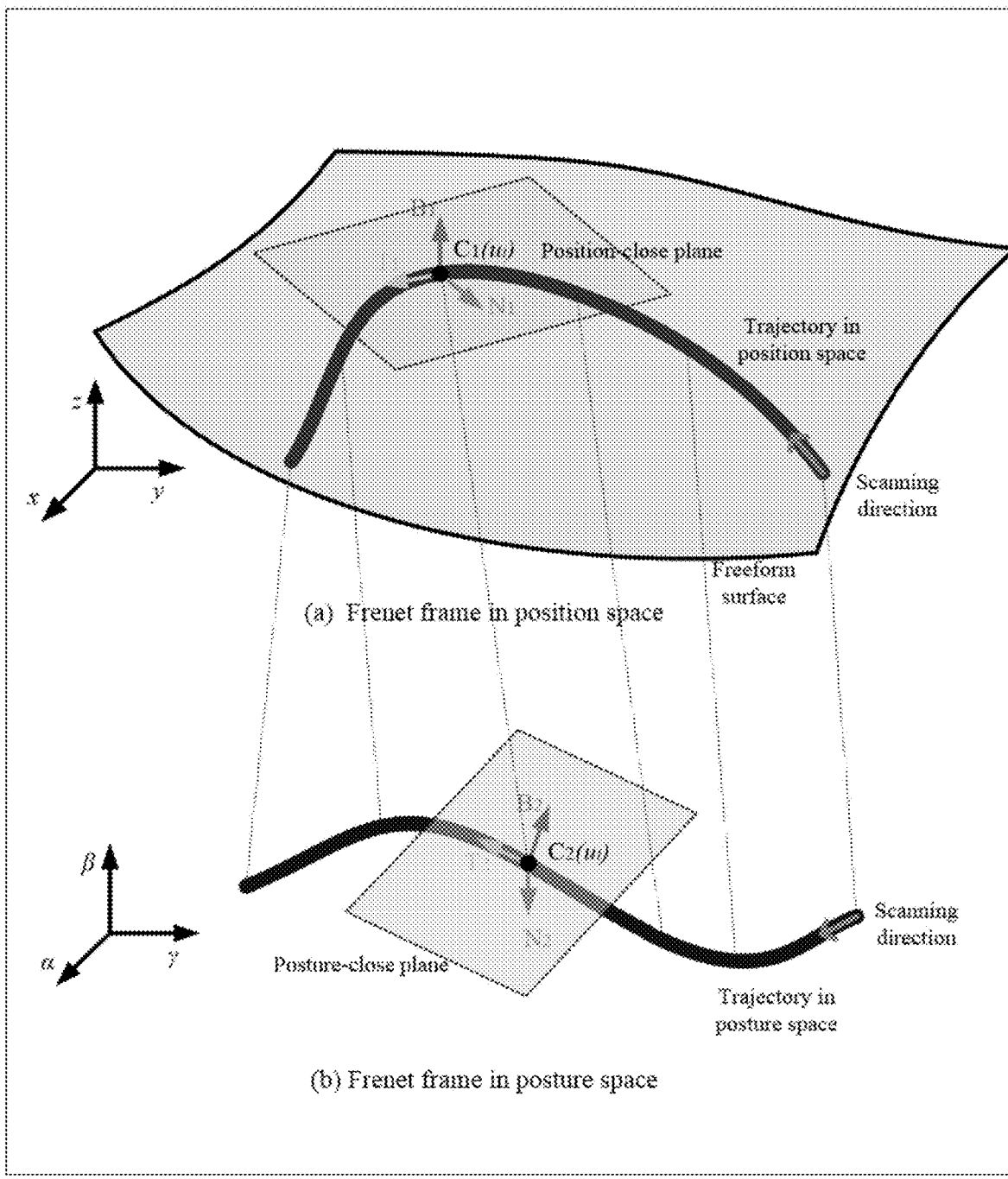
FIG. 11 illustrates a schematic diagram of an NURBS fitting of position and posture of a machining trajectory.

Through 6-dimensional NURBS curve interpolation and fitting, the original discrete trajectory points form a smooth and continuous machining trajectories, as shown in FIG. 11, which realizes the high-precision and high-synchronization description of the positions and postures of the laser cladding nozzle in the laser repair process.

In Step 6 of FIG. 1, curvature segment of the machining trajectory is performed, which includes the following steps.

Because the worn freeform surface is relatively complex, in order to follow the worn freeform surface with high precision, a curvature of a corresponding repair trajectory changes in a position space and a posture space, and there is a situation that a curvature of a local area is too larger. A traditional motion control method does not fully consider the problem of excessive local curvature in the position space and the posture space in the laser repair process, and adopts a constant machining velocity, which easily causes problems such as impact and flutter of the robot in an area with excessive curvature, which seriously affects the stability of the repair machining movement. Therefore, in order to reduce the mechanical impact of the movement of the robot, the disclosure adopts a self-adaptive position and posture trajectory segmentation method, the fitted position and posture trajectories are divided into dangerous segments (with excessive curvature) and safe segments, and proper machining velocities are allocated to ensure the smoothness and stability of the position and posture movement in the laser repair process.

As shown in FIG. 11, frenet frames are established in the position space and the posture space, respectively, and position and posture tangent vectors $T_1(u_i)$, $T_2(u_i)$, position and posture sub-normal vectors $B_1(u_i)$, $B_2(u_i)$ and position and posture main normal vectors $N_1(u_i)$, $N_2(u_i)$ are established with a current position and posture point $[C_1(u_i), C_2(u_i)]$ as an origin, where the position and posture tangent vectors $T_1(u_i)$, $T_2(u_i)$ and the position and posture main normal vectors $N_1(u_i)$, $N_2(u_i)$ respectively constitute a position-close plane and an posture-close plane. A specific calculation method for establishing the frenet frames is as follows:

$$\begin{cases} N_1(u_i) = B_1(u_i) \times T_1(u_i) \\ N_2(u_i) = B_2(u_i) \times T_2(u_i) \end{cases}$$

$$\begin{cases} B_1(u_i) = \dfrac{C_1'(u_i) \times C_1''(u_i)}{\|C_1'(u_i) \times C_1''(u_i)\|} \\ B_2(u_1) = \dfrac{C_2'(u_i) \times C_2''(u_i)}{\|C_2'(u_i) \times C_2''(u_i)\|} \end{cases}$$

$$\begin{cases} N_1(u_i) = B_1(u_i) \times T_1(u_i) \\ N_2(u_i) = B_2(u_i) \times T_2(u_i) \end{cases}$$

Furthermore, according to a curvature calculation formula, $C''(u_i) = s''(u_i)T(u_i) + \kappa[s'(u_i)]^2 N(u_i)$, where $s''(u_i)$ and $s'(u_i)$ are respectively a first derivative and a second derivative of a machining trajectory $s(u_i)$. After simplification, the curvatures in the position space and the posture space can be finally calculated by the following formulas, as follows:

$$\begin{cases} \kappa_1 = \dfrac{C_1''(u_i) \cdot N_1(u_i)}{[s_1'(u_i)]^2} = \dfrac{\|C_1'(u_i) \times C_1''(u_i)\|}{\|C_1'(u_i)\|^3} \\ \kappa_2 = \dfrac{C_2''(u_i) \cdot N_2(u_i)}{[s_2'(u_i)]^2} = \dfrac{\|C_2'(u_i) \times C_2''(u_i)\|}{\|C_2'(u_i)\|^3} \end{cases}$$

Figure 12:
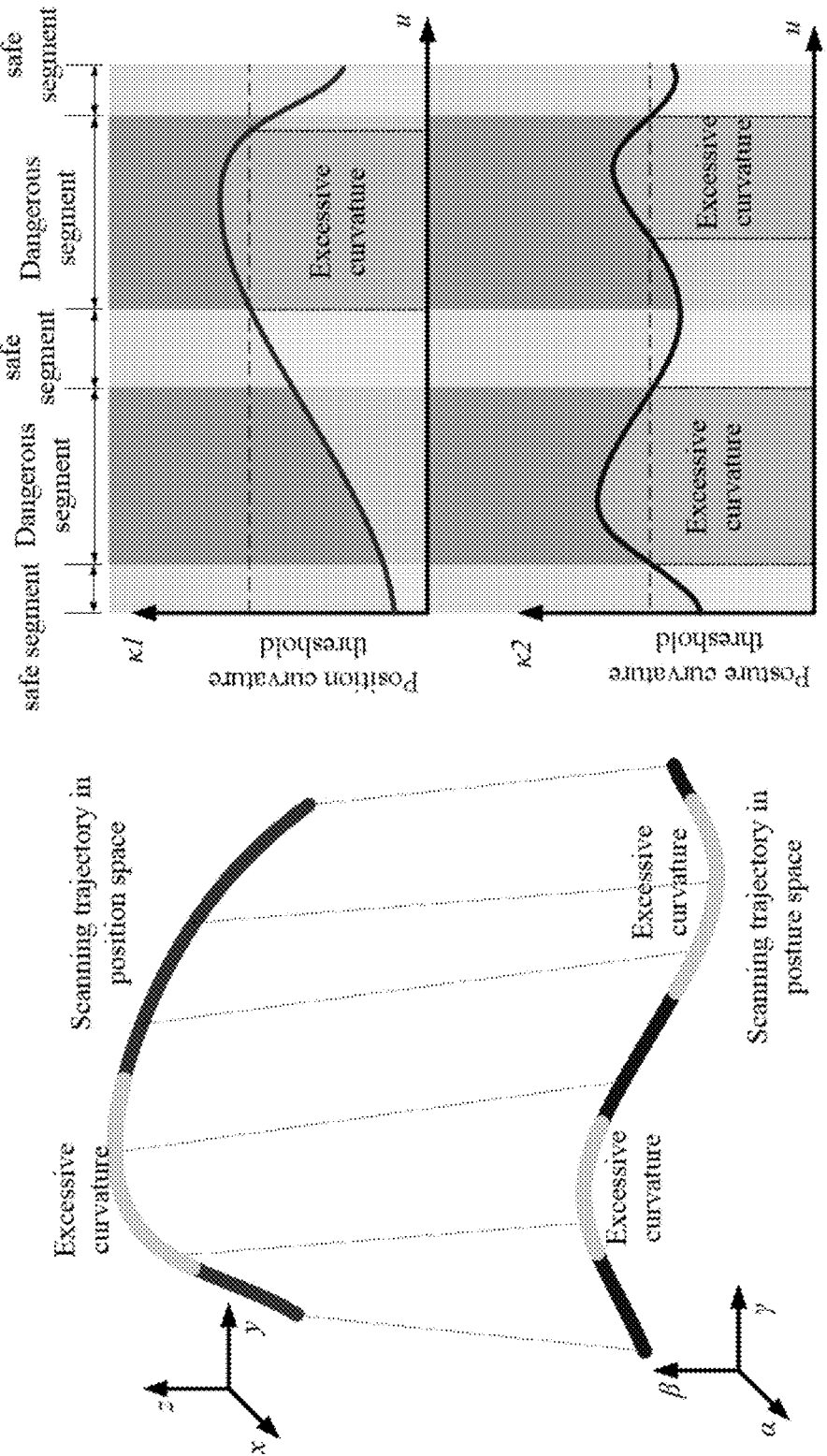
FIG. 12 illustrates a schematic diagram of curvature segmentation of a processing trajectory.

According to a given curvature threshold of position and posture trajectory, the fitted NURBS trajectories can be adaptively divided into dangerous segments and safe segments in the position space and the posture space, respectively, as shown in FIG. 12. Furthermore, proper machining velocities are allocated to the dangerous segment and the safe segment to avoid causing mechanical shocks in areas with excessive curvatures in the position space and the posture space and ensure the stability and smoothness of the laser repair process.

In Step 7 of FIG. 1, acceleration and deceleration look-ahead of segmented position and posture trajectories is performed, which includes the following steps.

Since the fitted NURBS trajectories of positions and postures are adaptively divided into the dangerous segments and the safe segments, and different processing velocities are allocated to the dangerous segments and the safe segments, velocity transition between different segments is the key issue. The disclosure provides a synchronous look-ahead method of position and posture segments based on an acceleration and deceleration law of S-curve, so as to realize fast and smooth switching of different processing velocities between segments and ensure the stability and smoothness of laser cladding processing.

Figure 13:
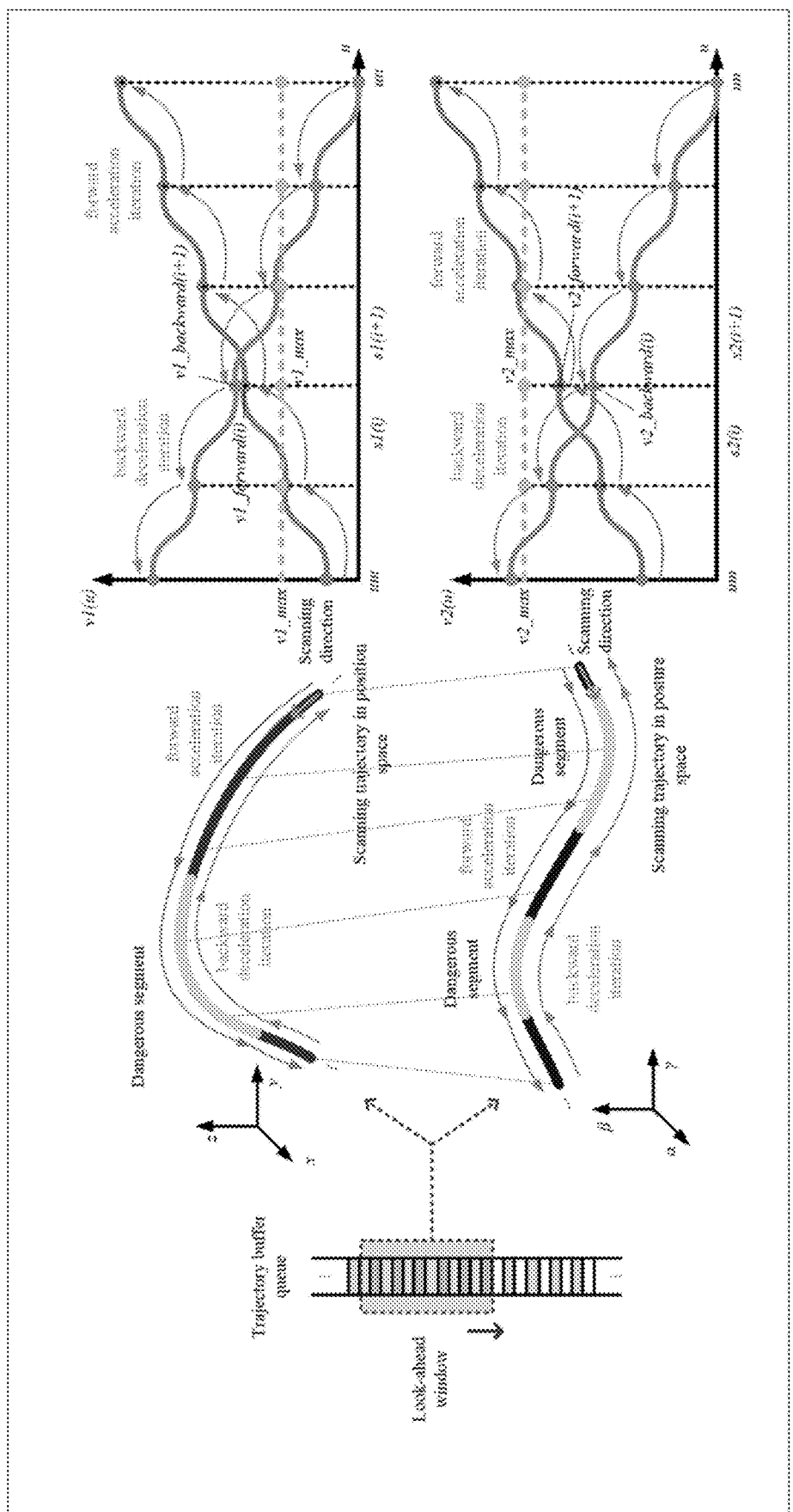
FIG. 13 illustrates a look-ahead schematic diagram of acceleration and deceleration of a segmented trajectory.

As shown in FIG. 13, adjacent segments of a current machining segment are stored in a look-ahead window, and the look-ahead window is gradually refreshed backwards from a beginning of a queue with the segment-by-segment machining until all machining trajectories are completed. In order to ensure the smooth and rapid velocity transition between different segments in the machining process, based on the acceleration and deceleration law of S-curve, a backward deceleration iteration and a forward acceleration iteration are outperformed in the position space and the posture space, respectively, and a starting velocity and an ending velocity of each segment are obtained by synchronously coordinating look-ahead results in the position space and the posture space.

Figure 14:
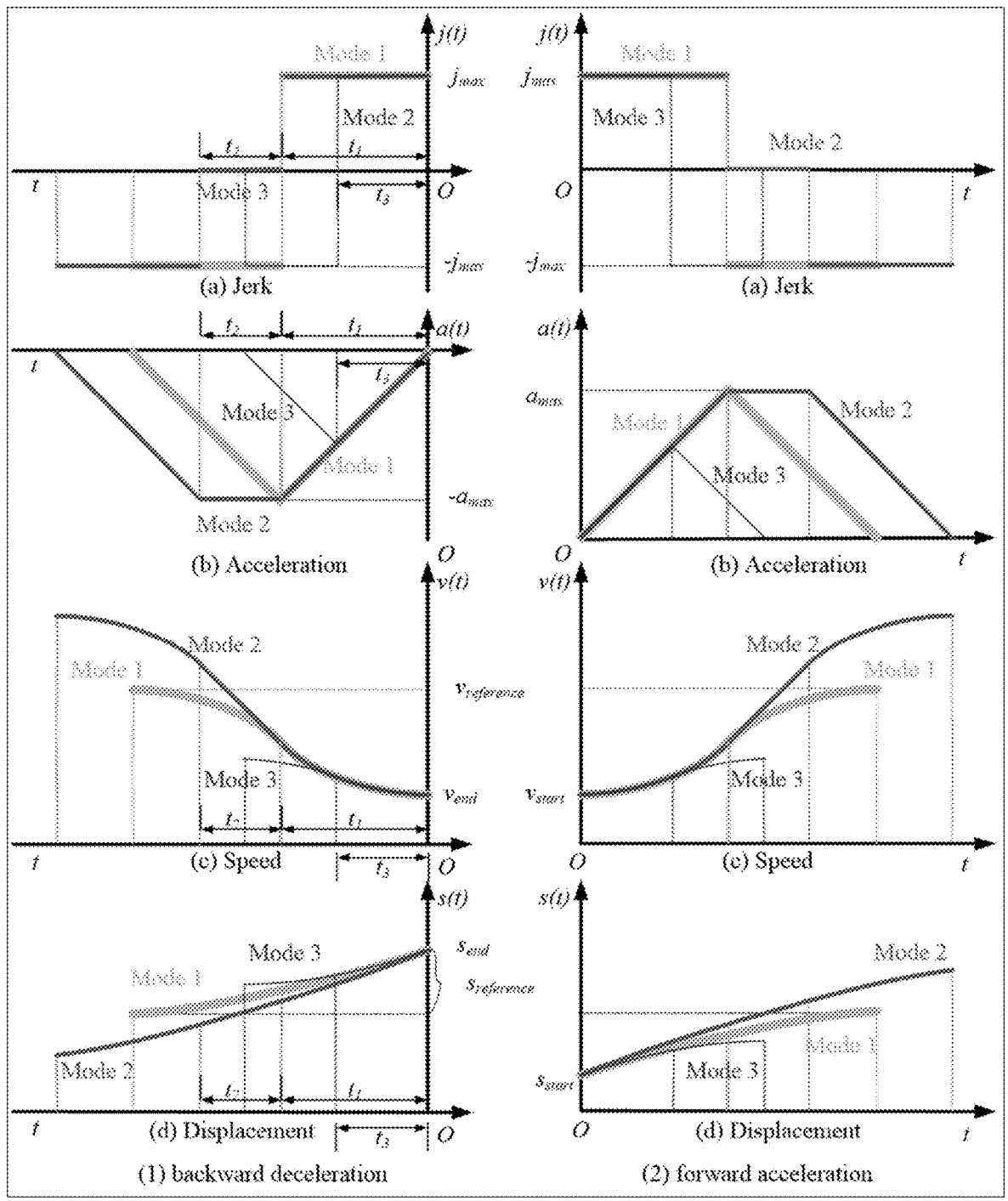
FIG. 14 illustrates a schematic diagram of an acceleration and deceleration foresight method based on an S curve.

The backward deceleration iteration is to ensure the safety of the machining process, realize safety requirement that a current position and posture velocity decelerate to zero in a look-ahead window, and ensure that a corresponding device has sufficient deceleration performance to cope with sudden emergency stop. The backward deceleration iteration is executed from a last segment of the look-ahead window to an initial segment of the look-ahead window, so as to obtain the maximum backward deceleration $v_{backward}$ allowed by the initial velocity of the current machining segment and ensure sufficient deceleration distance during the movement. According to the acceleration and deceleration law of S curve, as shown in (1) backward deceleration of FIG. 14, a reference distance $s_{reference}$ is calculated to determine a working mode of a current segment of backward deceleration, and the specific calculation process is as follows:

$$S_{reference}(i) = 2v_{end}(i)\dfrac{a_{max}}{j_{max}} + \dfrac{(a_{max})^3}{(j_{max})^2}$$

where $v_{end}$ (i) represents end velocity of the current segment, an end velocity of a last segment of an initial look-ahead window is 0, and an end velocity thereafter is a start velocity $v_{start}$ (i+1) obtain by a previous iteration. $a_{max}$ represents a maximum acceleration of the current segment, and $j_{max}$ represents a maximum jerk of the current segment.

Further, based on a comparison result between an actual length s of the current segment with the reference distance $s_{referrence}$, there are three different acceleration and deceleration modes: a mode 1, a mode 2, and a mode 3.

In the mode 1, $s(i)=s_{referrence}$, in a deceleration process of the current segment, the acceleration just reaches the maximum acceleration $-a_{max}$ from 0, and then decreases to 0 with the maximum jerk $j_{max}$. Therefore, a starting velocity of the current segment can be calculated by the following formula:

$$v_{start}(i) = v_{end}(i) + \frac{(a_{max})^2}{j_{max}}$$

In the mode 2, $s(i) > s_{referrence}$, after the acceleration reaches the maximum acceleration $-a_{max}$ from 0 in the deceleration process of the front segment, the acceleration will be maintained for a period of time, and then the acceleration will be reduced to 0 with the maximum jerk $j_{max}$. Therefore, the starting velocity of the current segment can be calculated by the following formula:

$$v_{start}(i) = \frac{\sqrt{(a_{max})^4 - 2(a_{max})^2 j_{max} v_{end}(i) + 2s(i)a_{max}(j_{max})^2 + (j_{max})^2[v_{end}(i)]^2} - (a_{max})^2}{2a_{max}j_{max}} - \frac{v_{end}(i)}{2a_{max}}$$

In the mode 3, $s(i) < s_{referrence}$, the acceleration starts from 0 in the deceleration process of the front segment, and decreases to 0 with the maximum jerk $j_{max}$ when the maximum acceleration $-a_{max}$ is not reached. Therefore, the starting velocity of the current segment can be calculated by the following formula:

$$v_{start}(i) = v_{end} + j_{max}(t_3)^2$$

$$p = \frac{2v_{end}}{j_{max}}, \quad q = -\frac{s(i)}{2j_{1\_max}},$$

$$t_3 = \sqrt[3]{-\frac{q}{2} + \sqrt{\left(\frac{q}{2}\right)^2 + \left(\frac{p}{3}\right)^3}} + \sqrt[3]{-\frac{q}{2} - \sqrt{\left(\frac{q}{2}\right)^2 + \left(\frac{p}{3}\right)^3}}$$

According to the above three modes, the starting velocity $v_{start}$ (i) can be obtained. Then, by forward refreshing, a starting velocity $v_{start}$ (i−1) of a next segment is calculated, and the starting velocity $v_{start}$ (i) of the previous segment is taken as an ending velocity $v_{end}$ (i−1) of the next segment, and the above algorithm is repeatedly iterated until the starting segment of the look-ahead window is reached, so that a final maximum backward deceleration Velocity $v_{backward}$.

The calculation method of the forward acceleration iteration is similar as the calculation method of the backward deceleration iteration. A current actual running velocity is taken as a starting velocity, and a maximum ending velocity that can be achieved in the look-ahead window is calculated to maximize the position and posture motion velocities. The forward acceleration iteration is executed from a beginning segment to an end segment of the look-ahead window, and the maximum forward acceleration velocity $v_{forward}$ allowed by an end velocity of the current machining segment is obtained. There are also three acceleration modes, as shown in (2) forward acceleration of FIG. 14.

Furthermore, by comparing the relationship between the forward acceleration velocity $v_{forward}$ and the backward deceleration velocity $v_{backward}$, a minimum value between them is taken as a final node velocity $v_{node}$. A position node velocity $v_{1\_node}$ and a posture node velocity $v_{2\_node}$ are calculated in a position space and a posture space, respectively, and a minimum mode velocity is taken as the final node velocity $v_{node}$ to realize the synchronization of position and posture motion. By putting forward a synchronous look-ahead method of position and posture segmentation based on an S-curve acceleration and deceleration law, the smooth and fast velocity switching between dangerous segment and safe segment in position space and posture space is realized, and synchronous, smooth and high-velocity control interpolation of position and posture motion of repair trajectories for a worn freeform surface is ensured.

In Step 8 of FIG. 1, coordinated control of robot position and posture motion with a laser process is performed, which includes the following steps.

Because the fitted machining trajectories are adaptively divided into safe segments and dangerous segments, and different machining velocities are allocated to the safe segments and dangerous segments, and there is acceleration and deceleration transition between different segments, the machining velocity of the laser cladding nozzle relative to the worn surface is dynamic during the laser repair process. In order to improve the quality of laser cladding repair and ensure the thermodynamic stability of a laser cladding molten pool during the laser repair process, it is necessary to dynamically adjust laser parameters according to an actual scanning velocity.

By periodically monitoring a motion state of the robot, a motion velocity $v_{nozzel}(t)$ of the laser cladding nozzle relative to the worn surface can be obtained by online calculation. Furthermore, according to a power density function $$E_s = \frac{P_e}{D \cdot V_e},$$

where $P_e$ represents an ideal laser power, $V_e$ represents an ideal scanning velocity, and D represents a spot diameter, a laser power parameter $P(t) = E_s \cdot D \cdot v_{nozzel}(t)$ is dynamically adjusted. By synchronously issuing robot position and posture control instructions and laser control parameters, the synchronization of repair movement and process of the worn freeform surface is realized, the thermodynamic stability of the laser cladding molten pool in the laser repair process is ensured, and the processing quality of laser cladding repair is improved.

Figure 15:
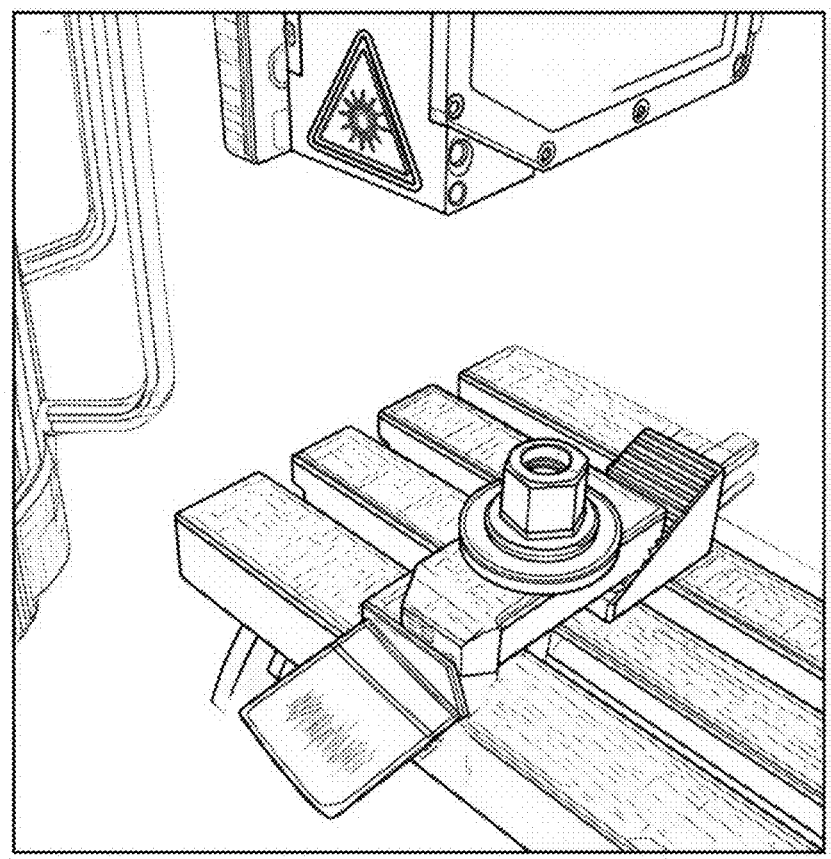
FIG. 15 illustrates an image of a worn gas turbine blade.

In order to further clarify the effectiveness and practicability of the present disclosure, an application case of the present disclosure, i.e., repair of turbine engine blade is verified by experiments. As shown in FIG. 15, due to long-term work in higher temperature, higher pressure and higher fatigue environment, a surface of the turbine engine blade is prone to irregular wear and deformation.

Figure 16:
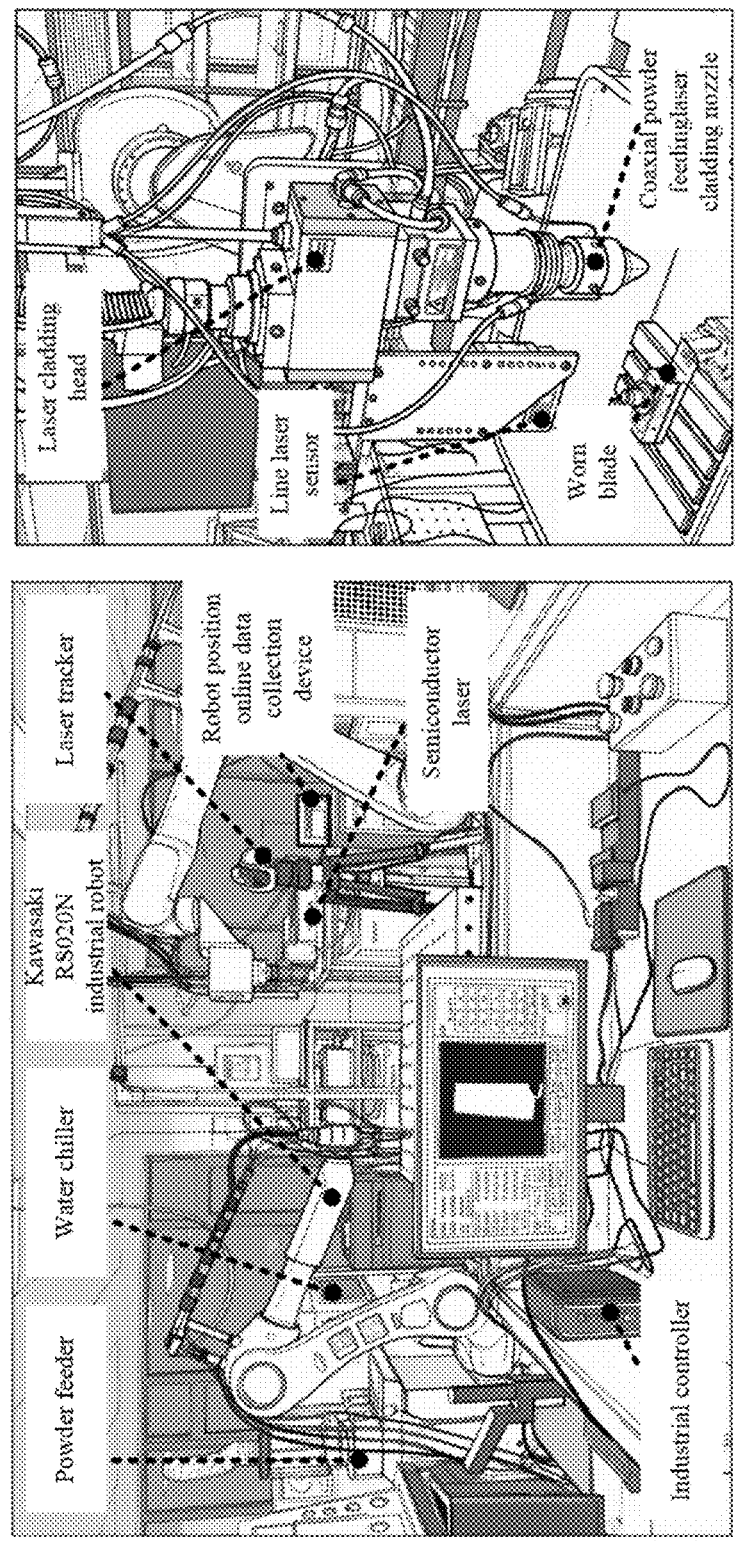
FIG. 16 illustrates a structural diagram of a laser repair apparatus for a worn blade.

FIG. 16 illustrates an experimental platform for robot laser repair, which consists of a robot, a line laser sensor, a laser, a water chiller, a powder feeder, a laser cladding head, and a coaxial powder feeding cladding nozzle. In addition, by installing a laser tracker target ball on the laser cladding head, robot position information is dynamically collected in an actual machining process, so as to verify the effectiveness and practicability of the posture optimization and following control method for the robot used in freeform surface repair proposed by the present disclosure.

Figure 17:
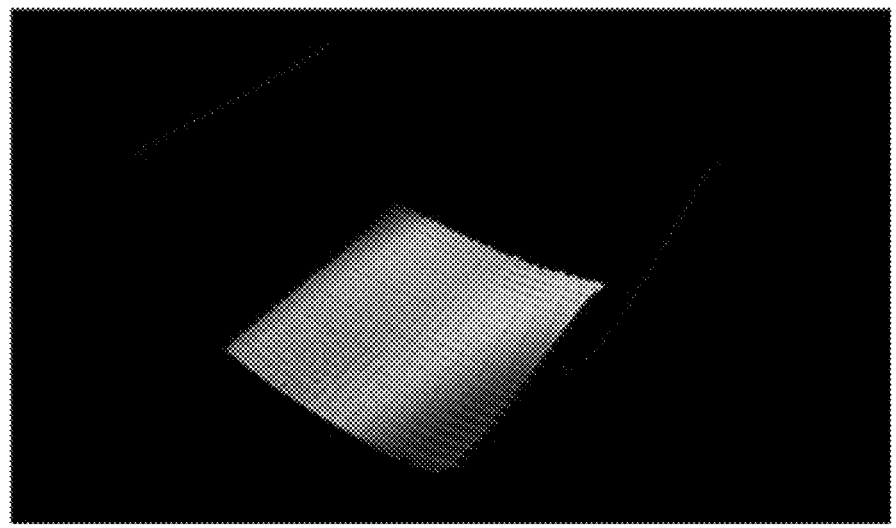
FIG. 17 illustrates an experimental diagram of an original machining trajectory for blade repairing.
Figure 18:
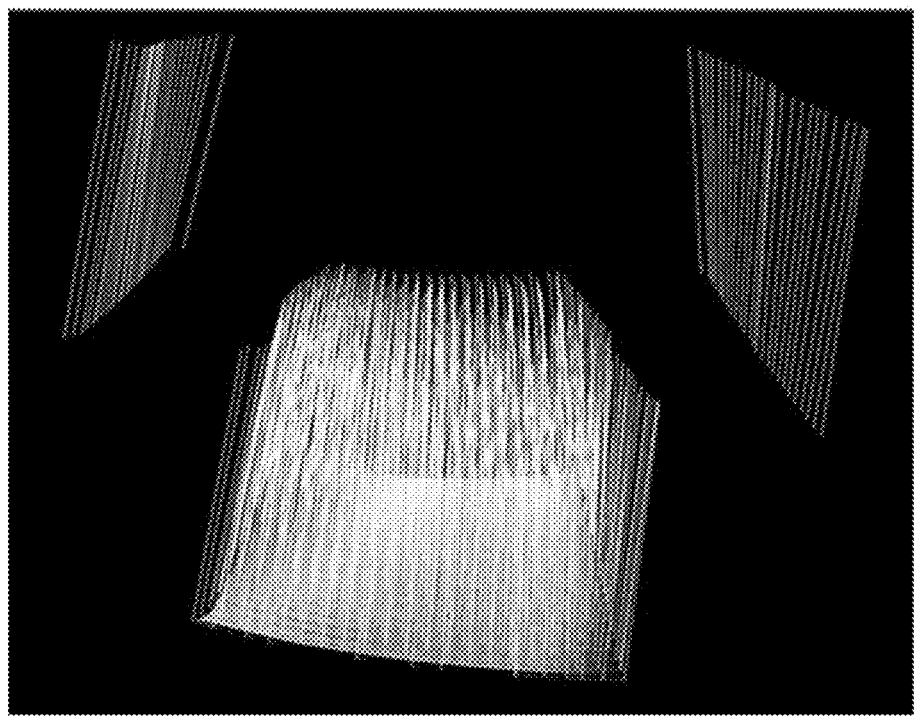
FIG. 18 illustrates an experimental diagram of an initial machining normal vector for blade repairing.

By driving the robot to carry the line laser sensor to scan a surface of the worn blade to be measured, as shown in FIG. 15, an actual shape, a size and micro-morphological characteristics of the worn blade are obtained online, as shown in FIG. 17. Further, original scanning trajectories can be obtained according to process requirements of blade cladding repair, and initial normal vectors at discrete points on the original scanning trajectories can be obtained by calculating original normal vectors of the point cloud and processing according to the planned machining trajectories, as shown in FIG. 18. Apparently, due to the distribution of a large number of tiny pits and protrusions after wear, initial normal vectors have the problem of jitter and unsmooth.

Figure 19:
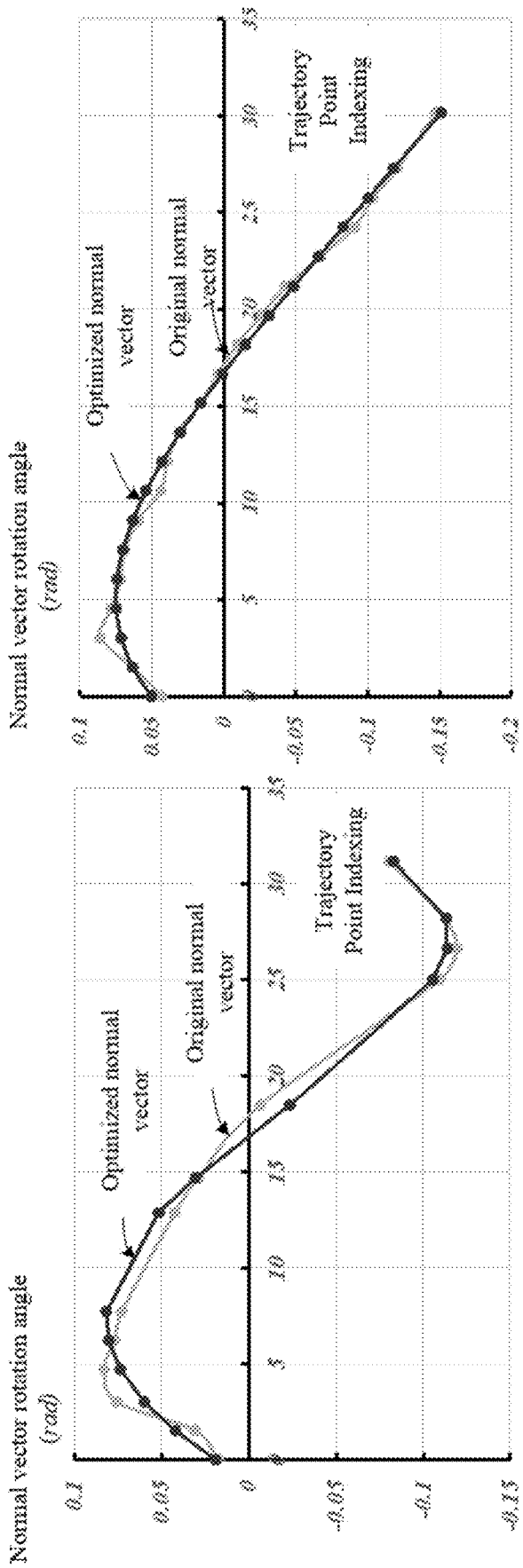
FIG. 19 illustrates an experimental diagram of regression fitting of an original normal rotation angle for blade repairing.
Figure 20:
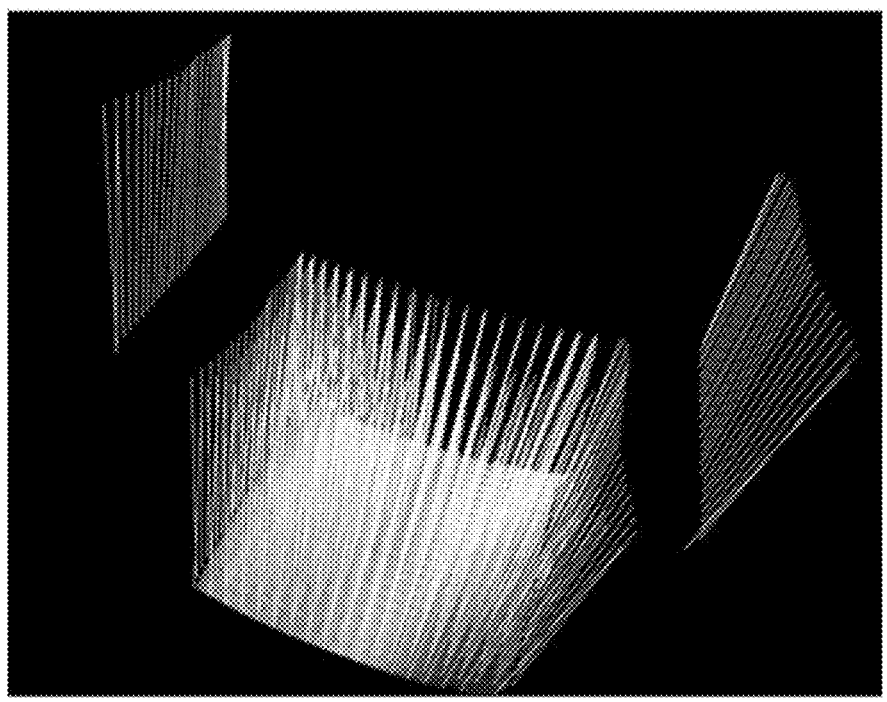
FIG. 20 illustrates an experimental diagram of an optimized processing normal vector for blade repairing.

Further, by applying a polynomial regression fitting method with a sliding window based on normal vector rotation angle, a trajectory plane for projecting the initial machining trajectories and the initial normal vectors is established, and then vector rotation angles are calculated according to the projected initial normal vectors, and the smoothing and debounce of the initial normal vectors in the machining process are realized by the sliding polynomial fitting method. FIG. 19 illustrates contrast effect diagrams of normal vector rotation angles of two machining trajectories before and after jitter-removal, and FIG. 20 illustrates a result diagram of normal vectors optimized by applying the method of the present disclosure. The results show that the normal vectors of the laser cladding nozzle can be guaranteed to be perpendicular to the surface to be machined to the greatest extent in the process of repairing freeform surfaces. In addition, the problem of normal vector jitter caused by tiny pits and protrusions on the worn surface is avoided, and the optimized laser machining posture can ensure the high precision and precision of the position and posture trajectory in the machining process.

Figure 21:
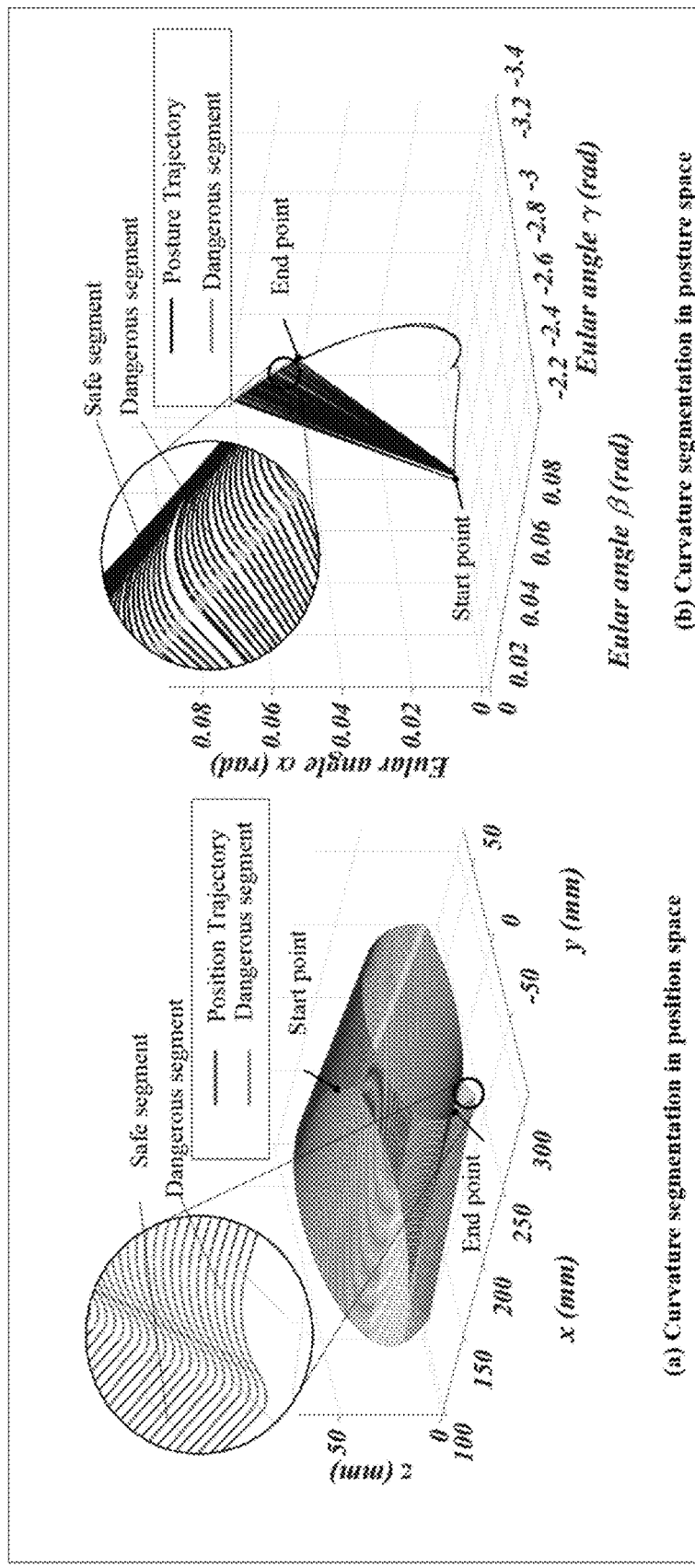
FIG. 21 illustrates an experimental diagram of the curvature segmentation of the position and posture trajectories for blade repairing.
Figure 22A:
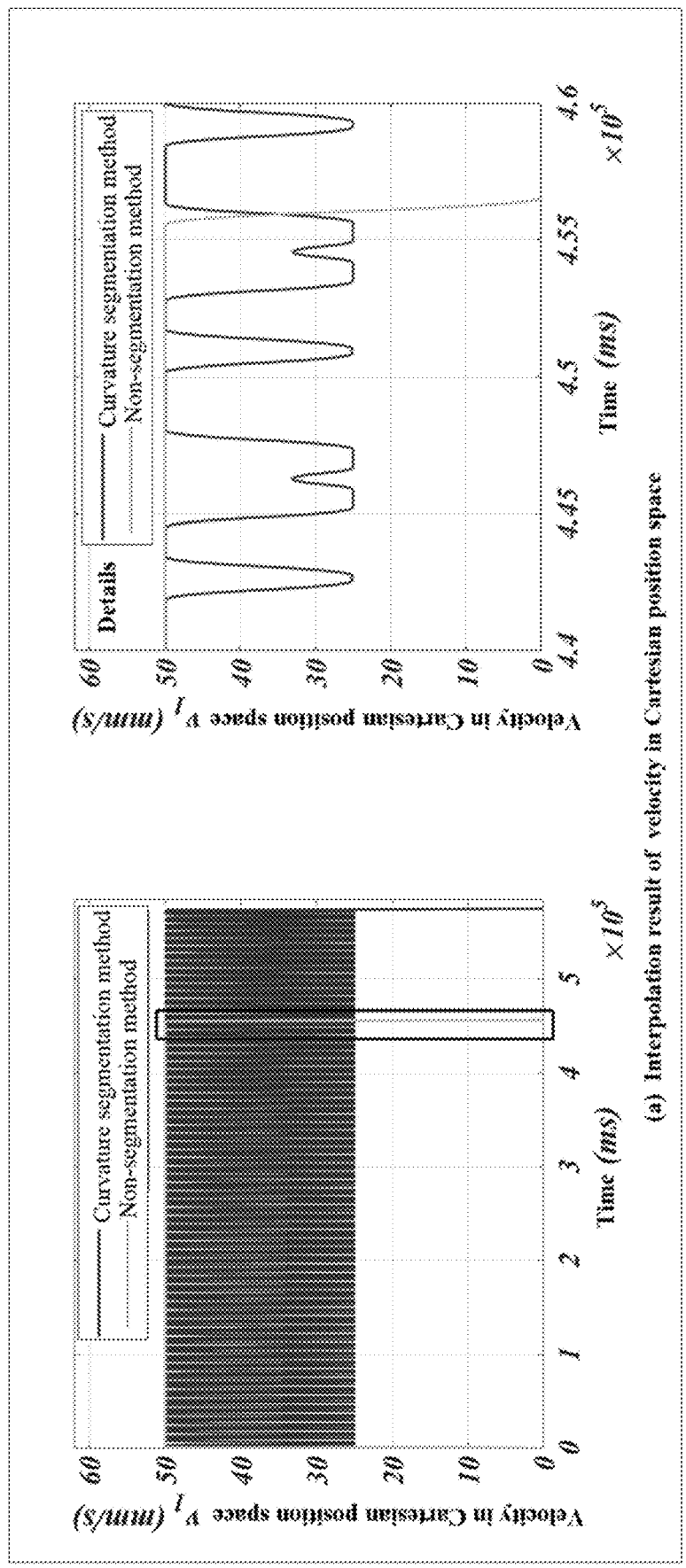
FIG. 22A, FIG. 22B, FIG. 22C, and FIG. 22D illustrate result diagrams of a velocity planning for the Cartesian position and posture for blade repairing.
Figure 22B:
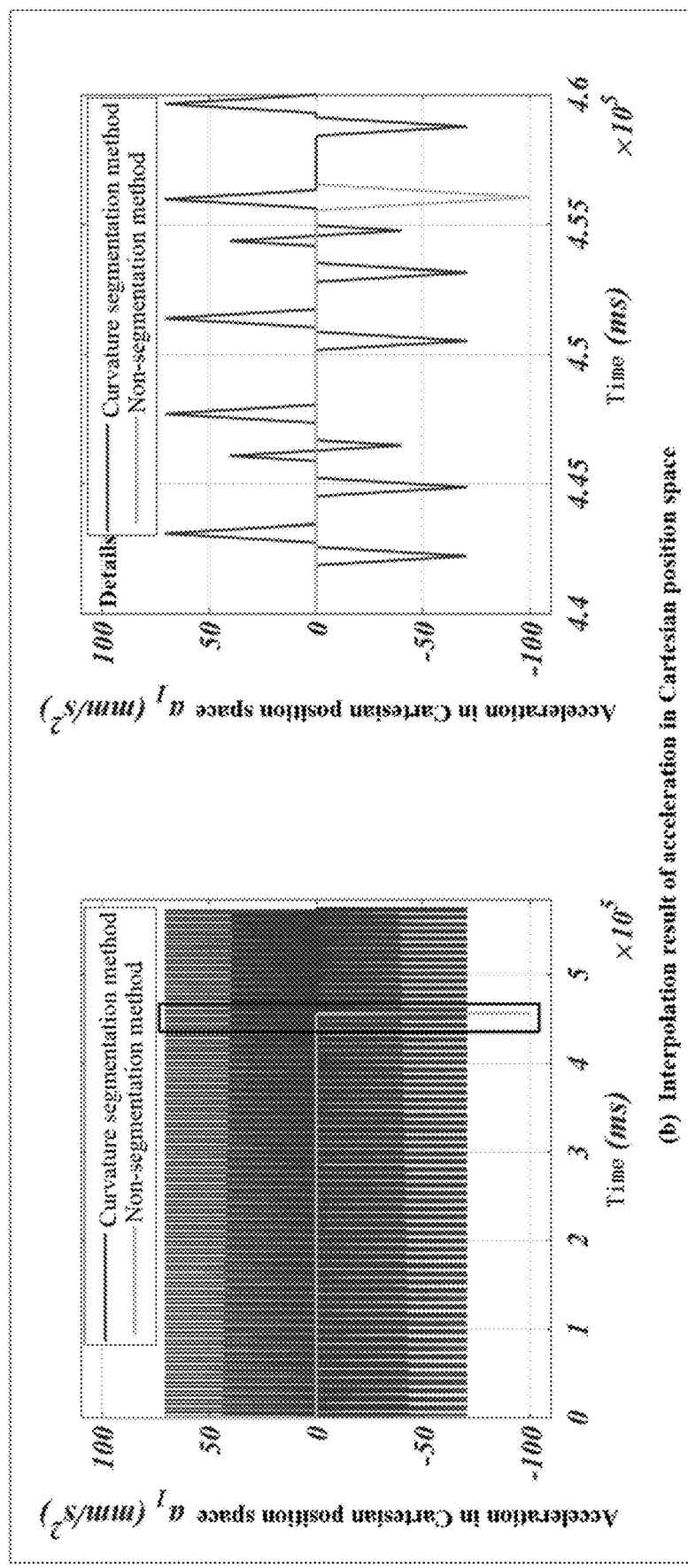
Figure 22C:
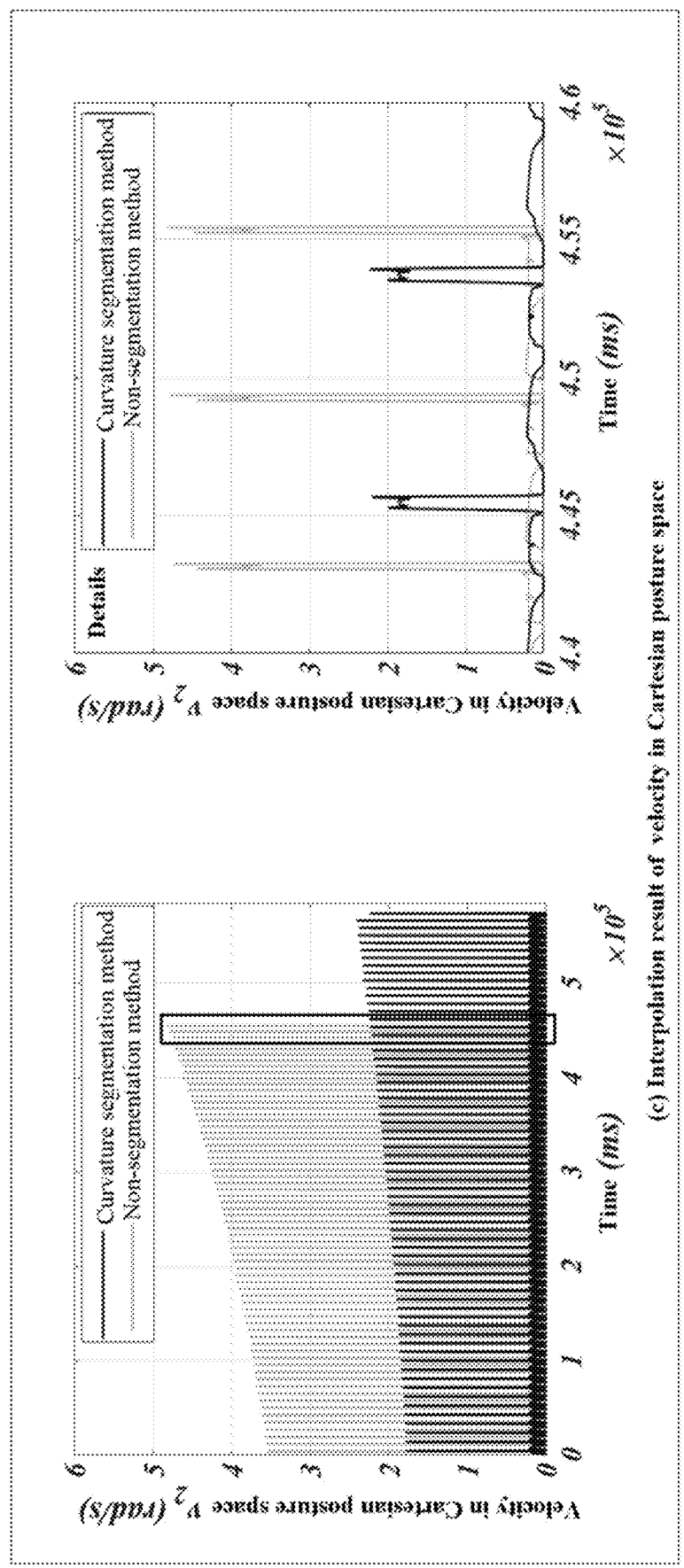
Figure 22D:
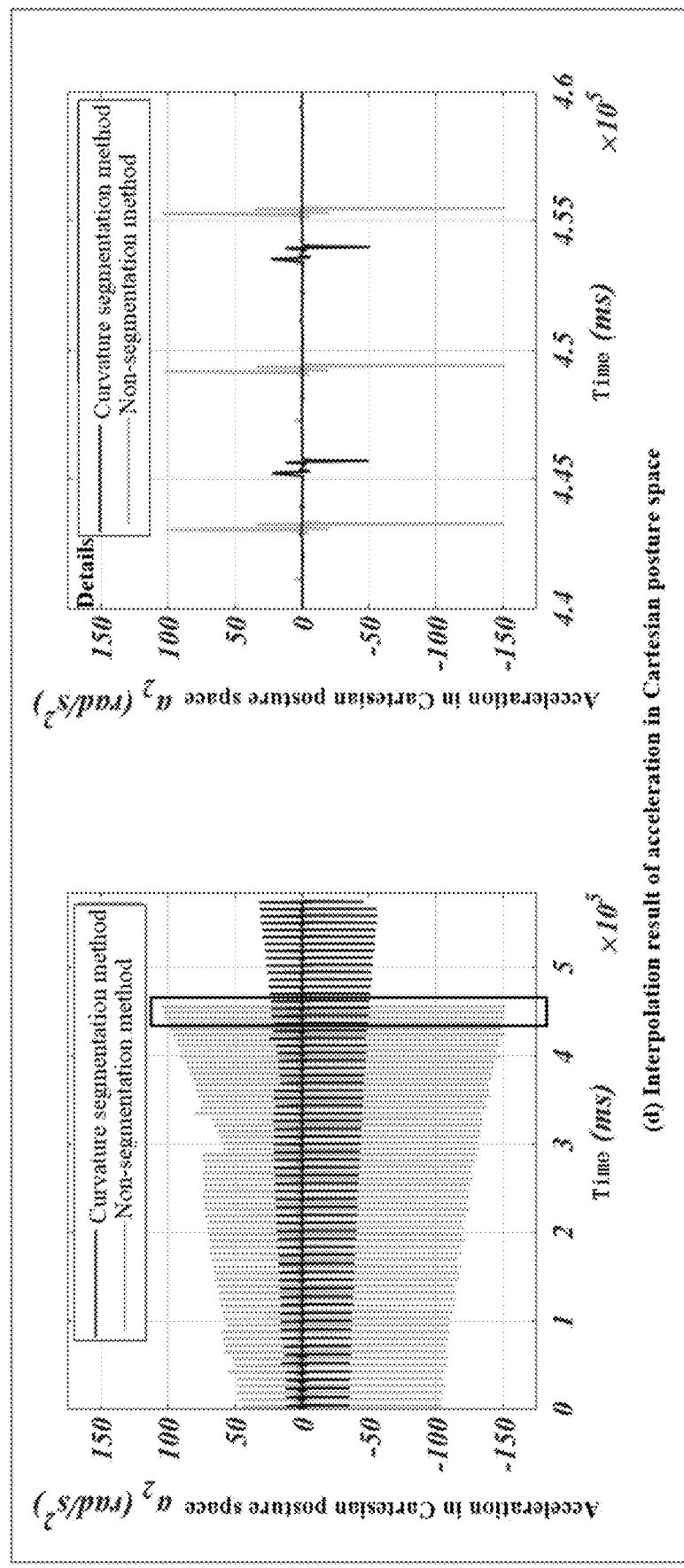
Figure 23A:
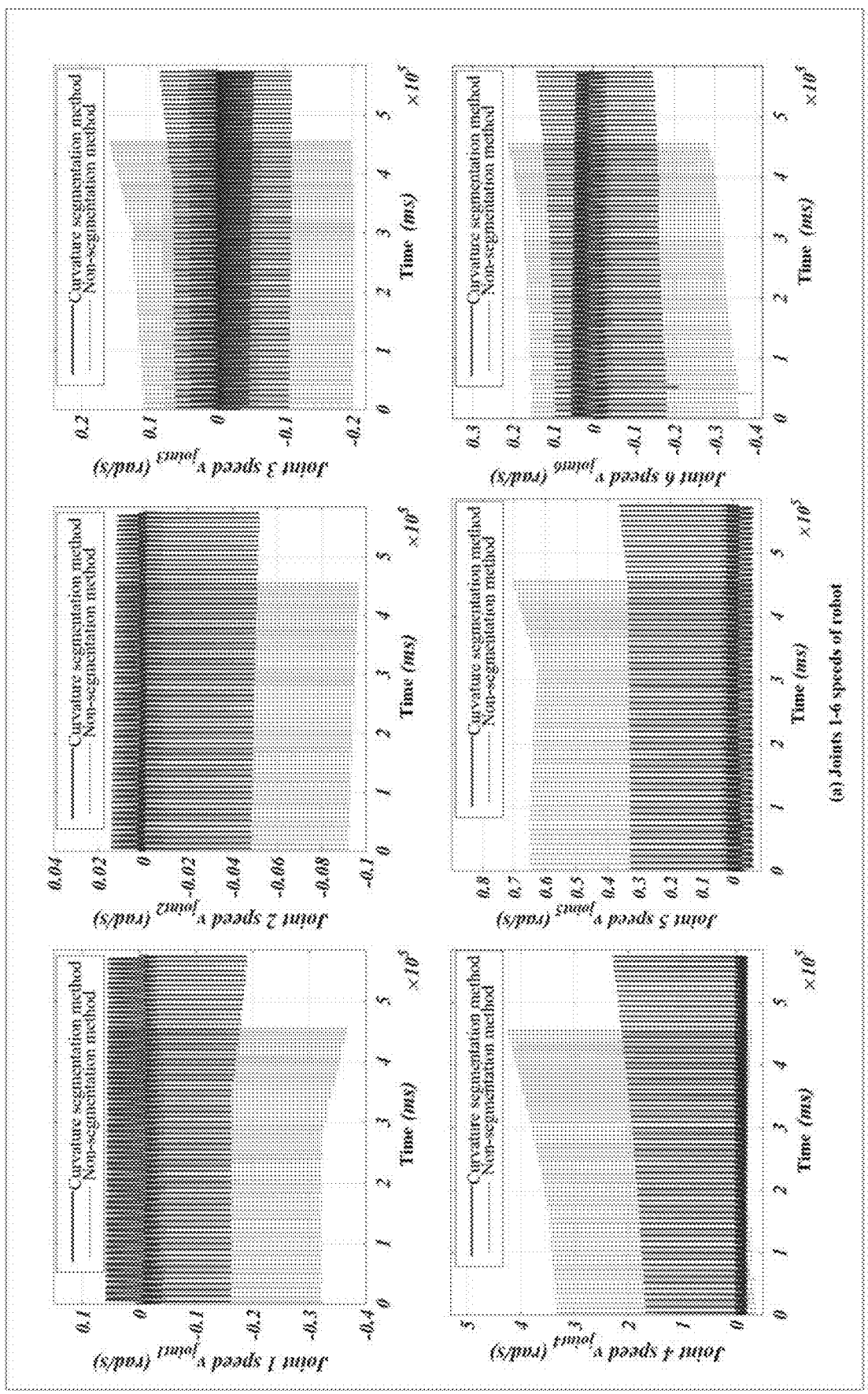
FIG. 23A and FIG. 23B illustrate feedback result diagrams of joints of a robot for blade repairing.
Figure 23B:
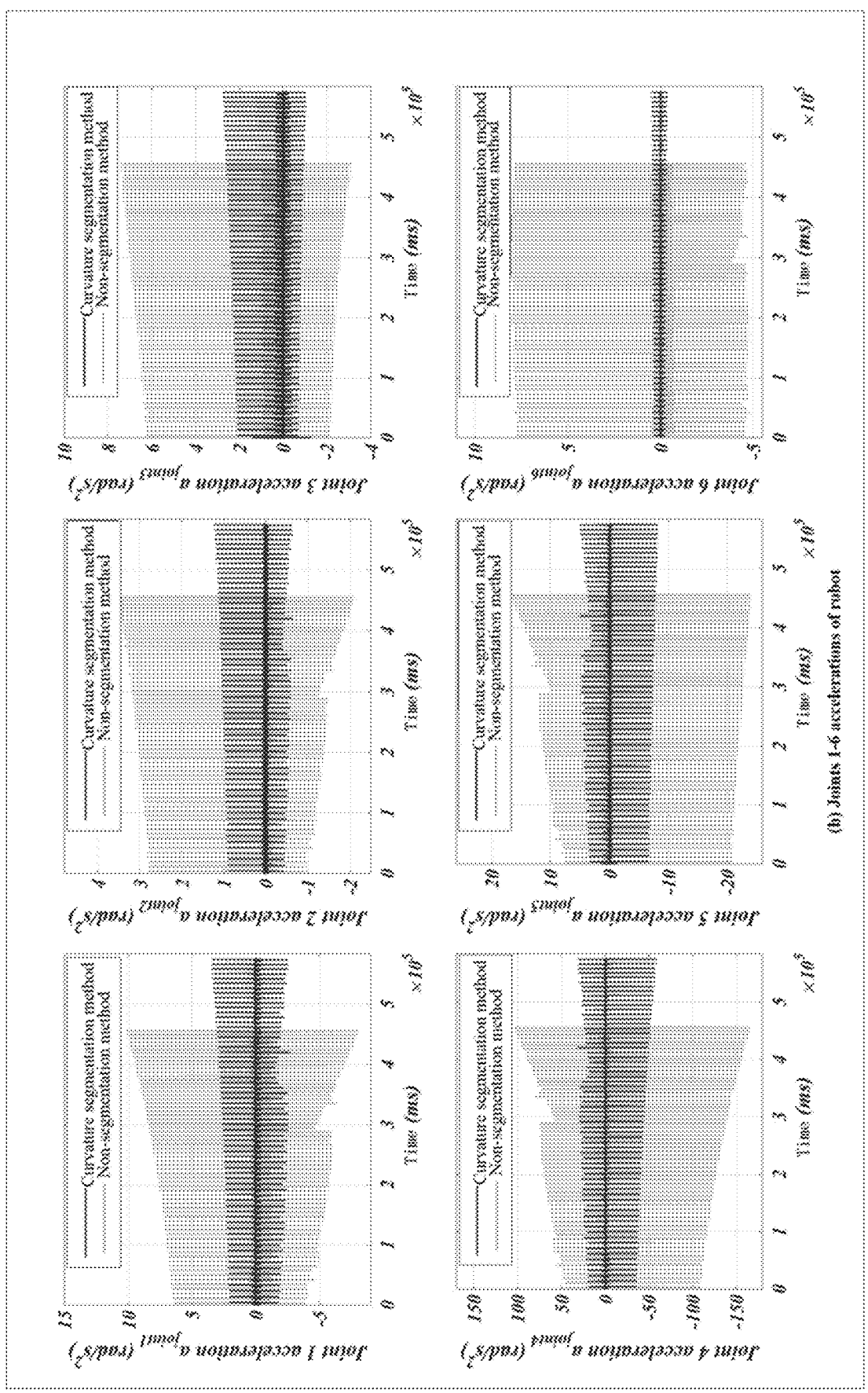
Figure 24:
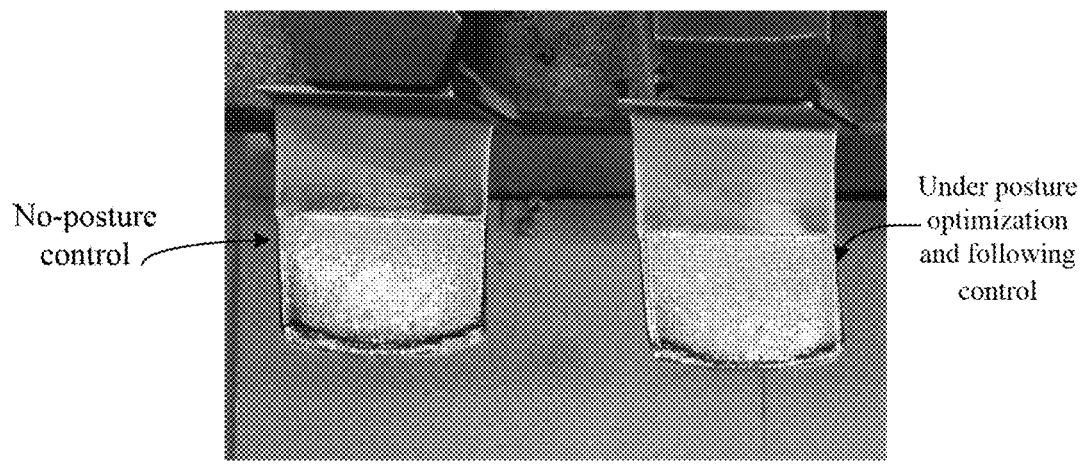
FIG. 24 illustrates comparison diagrams of blade repair effect.

Further, based on the optimized machining normal vectors, applying the NURBS fitting method of machining trajectory position and posture and the self-adaptive segmentation method of machining trajectory curvatures, discrete position and posture information of the worn blade is fitted into a smooth and continuous NURBS trajectory, and also, each machining trajectory is self-adaptively divided into safe segments and dangerous segments according to the curvature of the machining trajectory in the position space and the posture space. Furthermore, by using the look-ahead method of synchronous acceleration and deceleration of segmented trajectory position and posture and the cooperative control method of robot motion with a laser process, the stable, smooth and synchronous control of robot motion position and posture and laser technology in repair processing is finally realized, and the laser cladding repair processing of the worn surface of the blade is completed. FIG. 21 illustrates an experimental diagram of the curvature segmentation of the position and posture trajectories for blade repairing. The results show that this method can realize the generation of smooth and continuous cladding trajectories, and can accurately identify the parts with excessive curvatures in the position space and the posture space, and adaptively segment the machining trajectories. FIG. 22A, FIG. 22B, FIG. 22C, and FIG. 22D illustrate result diagrams of a velocity planning for the Cartesian position and posture for blade repairing, and FIG. 23A and FIG. 23B illustrate feedback result diagrams of joints of a robot for blade repairing. The results indicate that, compared with the method without segmentation interpolation, adaptive segmentation and appropriate velocity distribution can effectively reduce the actual maximum acceleration of a position in a Cartesian space, a posture in the Cartesian space, and a joint of a robot space during the machining process in segments with larger curvature. This method avoids robot jitter, vibration, and mechanical impact in segments with larger curvature, ensuring higher precision, smoothness, and fluidity of motion during laser repair machining. FIG. 24 illustrates comparison diagrams of the machining effects of a no-free control method and the posture optimization and follow-up control method described in the present disclosure. As a result, the posture optimization and follow-up control method proposed by the present disclosure can ensure that the machining posture is perpendicular to the surface to be machined to the greatest extent during the freeform surface repair process, and the problem of normal vector jitter caused by tiny pits and protrusions on the worn surface is avoided. Compared with the method without posture control, the repaired surface has a significant improvement in roughness, waviness, thermal deformation and other indicators, thus fully verifying the effectiveness and practicability of the posture optimization and following control method for a robot used in freeform surface repair proposed by the disclosure.

The above is merely exemplary embodiments of the present disclosure, but the scope of protection of the present disclosure is not limited to this, and any person familiar with the technical field should be included in the scope of protection of the present disclosure by replacing or changing it equally according to the technical solutions and inventive concept of the present disclosure within the technical scope disclosed by the present disclosure.

What is claimed is:

1. A posture optimization and following control method for a robot used in freeform surface repair, wherein the method comprises the following steps:

Step 1, collecting a contour of a worn freeform surface, performing reverse modeling on the worn freeform surface to obtain a reverse-reconstructed worn surface, and obtaining a size, a shape and microscopic surface topography characteristics of the worn freeform surface;

Step 2, performing denoising and sparsification on the reverse-reconstructed worn surface, and performing statistical calculation to obtain a distribution condition of original normal vectors of the reverse-reconstructed worn surface;

Step 3, designing, based on the reverse-reconstructed worn surface, machining trajectories for repairing the worn freeform surface, and combining, according to the distribution condition of the original normal vectors, positions and initial normal vectors of discrete trajectory points of the machining trajectories, to obtain 6-dimensional machining position and normal vector trajectory data;

Step 4, establishing a trajectory plane of each of the machining trajectories, and obtaining, by introducing a normal vector rotation angle and using a polynomial fitting noise reduction method with a sliding window, optimized machining position and normal vector trajectory data, comprising:
  establishing, based on the 6-dimensional machining position and normal vector trajectory data, the trajectory plane of each of the machining trajectories;
  performing planar projection on the initial normal vectors of the discrete trajectory points of the machining trajectories;
  calculating, by introducing the normal vector rotation angle, initial normal vector rotation angles at the discrete trajectory points;
  performing fitting denoising on the initial normal vector rotation angles to remove jitter of the initial normal vectors caused by microscopic pits and protrusions on the worn freeform surface; and
    reverse-solving optimized normal vector rotation angles after regression denoising, and obtaining the optimized machining position and normal vector trajectory data; Step 5, fitting, by introducing a 6-dimensional non-uniform rational b-splines (NURBS) curve, discrete position and posture data of the robot, to generate high-precision, smooth and synchronous motion position and posture trajectories of the robot;
Step 6, adaptively segmenting, based on curvatures of the motion position and posture trajectories in a position space and a posture space, the motion position and posture trajectories into hazardous segments and safe segments, and assigning processing velocities to the hazardous segments and the safe segments;
Step 7, performing, based on a position and posture synchronous look-ahead algorithm based on S-curve acceleration and deceleration, a backward deceleration iteration and a forward acceleration iteration to calculate node velocities of the hazardous segments and node velocities of the safe segments, to realize rapid and smooth transition of the processing velocities of the safe segments and the dangerous hazardous segments in the position space and the posture space; and
Step 8, performing, based on the node velocities of the hazardous segments and the node velocities of the safe segments, a laser repair process on the worn freeform surface, dynamically monitoring an actual movement velocity of the robot during the laser repair process, and adjusting laser cladding process parameters online to ensure thermodynamic stability of a laser cladding molten pool in the laser repair process and improve quality of laser cladding repair.

2. The posture optimization and following control method for the robot used in freeform surface repair as claimed in claim 1, wherein a calculation process of the original normal vectors comprises:
  performing denoising and sparsification on the reverse-reconstructed worn surface;
  performing statistical calculation to obtain a three-dimensional covariance matrix of an adjacent point set at each of discrete points on the reverse-reconstructed worn surface; and
  performing singular value decomposition (SVD) on the three-dimensional covariance matrix to obtain the original normal vectors of the discrete points of the reverse-reconstructed worn surface.

3. The posture optimization and following control method for the robot used in freeform surface repair as claimed in claim 1, wherein the designing, based on the reverse-reconstructed worn surface, machining trajectories for repairing the worn freeform surface, and combining, according to the distribution condition of the original normal vectors, positions and initial normal vectors of discrete trajectory points of the machining trajectories, to obtain 6-dimensional machining position and normal vector trajectory data comprises:
  designing, based on the reverse-reconstructed worn surface, the machining trajectories for repairing the worn freeform surface;
  traversing the discrete trajectory points of the machining trajectories to extract an original normal vector set corresponding to the adjacent point set of each of the discrete trajectory points;
  calculating a unit average vector of the original normal vector set, and taking the unit average vector as an initial normal vector of the discrete trajectory point to thereby obtain the initial normal vectors of the discrete trajectory points; and
  combining, according to the distribution condition of the original normal vectors, the positions and the initial normal vectors of the discrete trajectory points of the machining trajectories, to obtain the 6-dimensional machining position and normal vector trajectory data.

4. The posture optimization and following control method for the robot used in freeform surface repair as claimed in claim 1, wherein the fitting, by introducing a 6-dimensional NURBS curve, discrete position and posture data of the robot to generate high-precision, smooth and synchronous motion position and posture trajectories of the robot comprises:
  processing the optimized machining position and normal vector trajectory data to obtain the discrete position and posture data for motion control of the robot; and
  fitting, by introducing the 6-dimensional NURBS curve, the discrete position and posture data of the robot to generate the high-precision, smooth and synchronous motion position and posture trajectories of the robot.

5. The posture optimization and follow-up control method for the robot used in freeform surface repair posture optimization according to claim 1, wherein the adaptively segmenting, based on curvatures of the motion position and posture trajectories in a position space and a posture space, the motion position and posture trajectories into hazardous segments and safe segments, and assigning processing velocities to the hazardous segments and the safe segments comprises:
  calculating, based on the motion position and posture trajectories, the curvatures of the motion position and posture trajectories in the position space and the posture space;
  segmenting, based on a given curvature threshold, the motion position and posture trajectories obtained after NURBS fitting into the hazardous segments and the safe segments; and
  assigning the processing velocities to the hazardous segments and the safe segments, so as to avoid causing mechanical shocks in areas with excessive curvatures in the position space and the posture space, thereby ensuring smoothness and stability of a position motion and a posture motion during the laser repair process.

6. The posture optimization and follow-up control method for the robot used in freeform surface repair posture optimization according to claim 1, wherein the Step 7 comprises the following steps:
  for segmented motion position and posture trajectories obtained after the adaptively segmenting and stored in a trajectory buffer queue, storing adjacent segments of a current processing segment in a look-ahead window;

performing the backward deceleration iteration and the forward acceleration iteration to coordinate look-ahead results of the motion position and posture trajectories and thereby obtain the node velocities of the hazardous segments and the node velocities of the safe segments, so as to realize the rapid and smooth transition of the processing velocities of the safe segments and the hazardous segments in the position space and the posture space, and ensure synchronous, fast and smooth velocity switching between a position motion and a posture motion in a process of motion control interpolation.

* * * * *